United States Patent [19]

Moyne

[11] Patent Number: 5,469,361

[45] Date of Patent: Nov. 21, 1995

[54] GENERIC CELL CONTROLLING METHOD AND APPARATUS FOR COMPUTER INTEGRATED MANUFACTURING SYSTEM

[75] Inventor: James R. Moyne, Ypsilanti, Mich.

[73] Assignee: The Board of Regents Acting for and on Behalf of The University of Michigan, Ann Arbor, Mich.

[21] Appl. No.: 254,483

[22] Filed: Jun. 6, 1994

Related U.S. Application Data

[63] Continuation of Ser. No. 742,838, Aug. 8, 1991, abandoned.

[51] Int. Cl.$^6$ .......................... G06F 15/00; G05B 19/42
[52] U.S. Cl. ..................... 364/468; 364/191; 364/192; 364/474.11
[58] Field of Search ........................... 364/188, 191, 364/192, 468, 474.11, 478

[56] References Cited

U.S. PATENT DOCUMENTS

| | | | |
|---|---|---|---|
| 4,027,246 | 5/1977 | Caccoma et al. | 235/151.1 |
| 4,472,783 | 9/1984 | Johnstone et al. | 364/474 |
| 4,564,913 | 1/1986 | Yomogida et al. | 364/474 |
| 4,606,025 | 8/1986 | Peters et al. | 371/20 |
| 4,827,423 | 5/1989 | Beasley et al. | 364/468 |
| 4,837,704 | 6/1989 | Lengefeld | 364/478 |
| 4,858,102 | 8/1989 | Lovrenich | 364/136 |
| 4,888,692 | 12/1989 | Gupta et al. | 364/402 |
| 4,901,218 | 2/1990 | Cornwell | 364/131 |

(List continued on next page.)

OTHER PUBLICATIONS

*Successful Modeling of a Semiconductor R&D Facility*, B. Tullis et al., 1990 Int'l Semiconductor Manufacturing Science Symposium, pp. 26–32.

*An Application of Entity–Relationship Data Modeling Techniques* . . . J. R. Moyne et al., Proceedings of the Second International Conference for Data and Knowledge Systems for Manufacturing and Engineering, 1989, pp. 206–215.

*A Prototype SECS Message Service for Communication in the Semiconductor Manufacturing Environment*, J. R. Moyne et al., IEEE Transactions on Semiconductor Manufacturing, vol. 2, No. 4, Nov., 1989, pp. 165–177.

*A Synthesis of Factory Reference Models*, H. V. D. Parunak et al., Industrial Technology Institute, May 4, 1987, pp. 1–19.

*A Logical Design Methodology for Relational Databases Using the Extended Entity–Relationship Model*, T. J. Teorey et al., Computer Surveys, vol. 18, No. 2, Jun. 1986, pp. 197–222.

*Primary Examiner*—Paul P. Gordon
*Attorney, Agent, or Firm*—Bell, Seltzer, Park & Gibson

[57] ABSTRACT

A generic cell controlling method and apparatus for a computer integrated manufacturing system accepts manufacturing operation commands to perform a selected manufacturing operation on a selected manufacturing tool. The sequence of generic steps to be performed by the manufacturing tool is determined, in order to implement the selected manufacturing operation. Each step is used to generate operational instructions for the tool controller. The sequence of generic steps is preferably produced using a database which has an entry for each manufacturing operation. Each entry includes parameters which are specific for each tool, and an indication of sequence of steps to be performed. When a manufacturing operation command is received, the command is matched to a database entry and the parameters and sequences associated with that entry are used to call a series of routines or modules. Associated parameters are provided to each routine for generating the operational instructions for the particular tool. The routines or modules which are called by the database are independent of one another. Accordingly, a particular routine can be easily updated or a new routine can be easily added. New interfaces to new tools may be provided by generating one or more routines and providing new data in the existing database structure. A learning mechanism may be provided to allow the generic cell controller to be taught how to handle new instructions while in operation.

31 Claims, 17 Drawing Sheets

U.S. PATENT DOCUMENTS

| | | | |
|---|---|---|---|
| 4,901,242 | 2/1990 | Kotan | 364/468 |
| 4,928,221 | 5/1990 | Belkhitec | 364/191 |
| 4,941,181 | 7/1990 | Igarashi et al. | 382/1 |
| 4,967,381 | 10/1990 | Lane et al. | 364/192 |
| 5,014,208 | 5/1991 | Wolfson | 364/468 |
| 5,050,088 | 9/1991 | Buckler et al. | 364/468 |
| 5,126,932 | 6/1992 | Wolfson et al. | 364/468 |
| 5,155,679 | 10/1992 | Jain et al. | 362/402 |
| 5,321,605 | 6/1994 | Chapman et al. | 364/402 |
| 5,325,304 | 6/1994 | Aoki | 364/468 |
| 5,325,582 | 7/1994 | Glaser et al. | 29/840 |

ENTITIES:
- MESSAGE(<u>MESSAGE#</u>, MESSAGE_DATA, ACTION #,...)
- TIMER(<u>TIMER#</u>, DESCRIPTION, DEFAULT_VALUE,...)
- TIMER_INSTANCE(<u>TIMER INST#</u>, TIMER#, START-TIME, TIMEOUT_VAL, ACTION#,...)
- ACTION(<u>ACTION#</u>, DESCRIPTION,...)
- ROUTINE(<u>ROUTINE#</u>, DESCRIPTION,...)
- INVOCATION_NUM(<u>INVOCATION#</u>)

RELATIONS DERIVED FROM ENTITY RELATIONSHIPS:
- INVOKED_BY(<u>INVOCATION#</u>, ACTION#, ROUTINE#, PARAMETER_PTR,...)

NOTES:
- CANDIDATE KEYS ARE <u>UNDERLINED</u>
- FOREIGN KEYS ARE IN BOLDFACE
- *THE "INVOCATION_NUM" RELATION WOULD MOST LIKELY BE DELETED IN A REVISED SCHEMA

FIG. 9.

ENTITIES:
- MESSAGE(<u>MESSAGE#</u>, <u>STREAM#</u>, <u>FUNCTION#</u>, <u>INSTANCE</u>, ACTION#...)
- LIST(<u>LIST#</u>, PARENT_LIST#, PARENT_MESSAGE#...)
- ITEM(<u>ITEM#</u>, FORMAT, PARENT_LIST#, PARENT_MESSAGE#,...)
    - 2BYTEINTEGERITEM(ITEM#, DATA,...)
    - 2BYTEBINARYITEM(ITEM#, DATA,...)
    - ASCIISTRINGITEM(ITEM#, DATALENGTH, DATA,...)
    - ETC...

NOTES:
- CANDIDATE KEYS ARE <u>UNDERLINED</u>
- FOREIGN KEYS ARE IN BOLDFACE

GENERIC CELL CONTROLLER

UNKNOWN MESSAGE EVENT DETECTED

OPTIONS:

▢ SERVICE EVENT WITH GCC IN OPERATION

▢ RETURN TO GCC IDLE WITHOUT SERVICING EVENT

▢ EXIT GCC OPERATION

CLICK ON APPROPRIATE OPTION

ENTER AUTHORIZATION PASSWORD ▭

GENERIC CELL CONTROLLER

UNKNOWN MESSAGE EVENT SERVICE MENU: "LINK MESSAGE TO ACTION"

OPTIONS:

☐ VIEW MESSAGE DETAILS

☐ VIEW AVAILABLE ACTIONS

☐ ESCAPE TO PREVIOUS MENU

FIG. 12B.

CLICK ON APPROPRIATE OPTION

ENTER ACTION NUMBER TO BE LINKED TO MESSAGE (ENTER "0" TO CREATE A NEW ACTION)   ☐

GENERIC CELL CONTROLLER

UNKNOWN MESSAGE EVENT DETECTED: "LINK NEW ACTION TO ROUTINE CALL SEQUENCE"

OPTIONS:

☐ VIEW LIST OF AVAILABLE ROUTINES

☐ ROUTINE/PARAMETER/INVOCATION LIST COMPLETE

☐ ESCAPE TO PREVIOUS MENU

FIG. 12C.

CLICK ON APPROPRIATE OPTION

| ENTER INVOCATION OF ACTION | | |
|---|---|---|
| INVOCATION# | ROUTINE# | PARAMETER LIST# |
| 1 | | ( , , , , ) |
| 2 | | ( , , , , ) |
| 3 | | ( , , , , ) |
| 4 | | ( , , , , ) |
| 5 | | ( , , , , ) |
| 6 | | ( , , , , ) |
| 7 | | ( , , , , ) |
| ... | | |

TO FIG. 13B.

FROM FIG. 13A.

TIMER

| TIMER# | DEFAULTVALUE | TYPE |
|---|---|---|
| ... | | |
| 3 | 60 | "EVENTSERVICELEARN" |
| 4 | 30 | "CONVERSATION" |
| 5 | 10 | "EXPERTSYSTEMDECISION" |
| ... | | |

TIMER_INSTANCE  (ID DEPENDENCE)

| TIME_INST# | TIMER# | START_TIME | ... | ACTION# |
|---|---|---|---|---|
| ... | | (NO PERTINENT ENTRIES AT THE BEGINNING OF THE EXAMPLE) | | |
| ... | | | | |

ROUTINE

| ROUTINE# | NAME |
|---|---|
| 1 | "WAIT" |
| 2 | "ACTIVATEDBMESSAGE" |
| 3 | "LOGEVENT" |
| 4 | "TIMERADD" |
| ... | |
| 27 | "REMOTECOMMANDACK" |
| 28 | "REMOTECOMMANDNACK" |
| 29 | "PPLOADINQUIRE" |
| ... | |

FIG. 13B.

GENERIC CELL CONTROLLING METHOD AND APPARATUS FOR COMPUTER INTEGRATED MANUFACTURING SYSTEM

This is a continuation of application Ser. No. 07/742,838, filed on Aug. 8, 1991, now abandoned.

FIELD OF THE INVENTION

This invention relates to manufacturing systems and more particularly to computer integrated manufacturing systems.

BACKGROUND OF THE INVENTION

Computer integrated manufacturing systems have been developed to provide efficient and flexible manufacturing. In a computer integrated manufacturing system, many manufacturing tools are linked by a factory controller, with the factory controller directly or indirectly controlling the operation of the tools to produce a finished product. Computer integrated manufacturing systems are described in U.S. Pat. No. 4,472,783 to Johnstone et al. entitled *Flexible Manufacturing System*; U.S. Pat. No. 4,564,913 to Yomogita et al. entitled *Flexible Transfer Machine*; U.S. Pat. No. 4,827,423 to Beasley et al. entitled *Computer Integrated Manufacturing System*; and U.S. Pat. No. 4,837,704 to Lengefeld entitled *Computer Controlled Material Handling*. Computer integrated manufacturing systems are surveyed in a publication entitled *A Synthesis of Factory Reference Models* by Parunak et al., Proceedings of the IEEE Workshop on Languages for Automation, August 1987.

A computer integrated manufacturing facility typically includes many manufacturing tools, from many different manufacturers, each of which typically includes its own tool controller. The factory controller provides global level control, and interfaces with the tool controllers via one or more levels of cell controllers in a hierarchical system. A cell controller may link the factory controller with one or more tool controllers. Alternatively, a cell controller may link a factory controller or another cell controller to one or more cell controllers or one or more tool controllers. The cell controllers provide an interface for translating global level control instructions from the factory controller to the specific operational instructions for a selected tool controller so that the tool performs desired manufacturing operations.

Computer integrated manufacturing techniques have also been applied to the automated manufacture of microelectronic or semiconductor devices. Computer integrated manufacturing systems which are specifically directed to microelectronic device manufacture are described in U.S. Pat. No. 4,027,246 to Caccoma et al. entitled *Automated Integrated Circuit Manufacturing System*; and U.S. Pat. No. 4,901,242 to Kotan entitled *System for Manufacturing Production of Semiconductor Devices*. Modeling of a semiconductor manufacturing facility was described in an article entitled *Successful Modeling of the Semiconductor R & D Facility* by Tullis et al., International Semiconductor Manufacturing Science Symposium Proceedings, May, 1990. In the semiconductor manufacturing environment, research has been directed to integrated network communications in the facility. See U.S. Pat. No. 4,901,218 to Cornwell entitled *Communications Adaptor For Automated Factory System* and an article by the present inventors entitled *A Prototype SECS Message Service for Communication in a Semiconductor Manufacturing Environment*, IEEE Transactions on Semiconductor Manufacturing, Vol. 2, No. 4, November, 1989.

Notwithstanding all of the research in computer integrated manufacturing methods and systems, the cell controller itself has not been well defined. Typically, to the best of Applicant's knowledge, a cell controller is designed for each specific interface required in the computer integrated manufacturing system. This specific design is undertaken notwithstanding the fact that many of the functions of the cell controller would appear to be common for all cell controllers. This commonality of function is present because many of the tools perform similar functions even though they originate from different manufacturers or are different models from a particular manufacture. Moreover, even different tools include certain common instructions, for example for admitting the workpiece into the tool and for discharging the workpiece from the tool.

The requirement of a custom design for each cell controller has limited the flexibility of computer integrated manufacturing systems. It is difficult to upgrade a tool or to reconfigure the tools for a new manufacturing process when using customized cell controllers.

SUMMARY OF THE INVENTION

It is therefore an object of the invention to provide an improved cell controlling method and apparatus for a computer integrated manufacturing system.

It is another object of the invention to provide a cell controlling method and apparatus which can interface with a wide variety of manufacturing tools.

It is yet another object of the invention to provide a cell controlling apparatus which can easily accommodate upgrades and changes in an associated tool or tool controller.

These and other objects are provided, according to the present invention by a generic cell controlling method and apparatus having a design which interfaces to a wide variety of manufacturing tools. The generic cell controller accepts manufacturing operation commands to perform a selected manufacturing operation on a selected one of the manufacturing tools. The controller determines a sequence of generic steps to be performed by the manufacturing tool in order to implement the selected manufacturing operation. Each step is used to generate operational instructions for the particular tool controller, and the sequence of operational instructions is provided to the tool controller for controlling the tool to perform the selected manufacturing operation.

In a preferred embodiment of the present invention, the sequence of generic steps is produced using a database which has an entry for each manufacturing operation. Each entry includes parameters which are specific for each tool and an indication of a sequence of steps to be performed. Then, when a manufacturing operation command is received, the command is matched to a database entry, and the parameters and sequences associated with that entry are used to call a series of routine modules. The associated parameters are provided to each routine for generating the operational instructions for the particular tool.

The generic cell controller of the present invention allows control information to be encoded into the database. The routine modules which are called by the database are independent of one another. Individual modules do not interact with each other; they only interact with the database. Accordingly, a particular routine can be easily updated or a new routine can be added without destroying the overall architecture of the generic cell controller. In fact, modules may be implemented in different languages to interact with different controllers.

The cell controlling method and apparatus of the present invention may be thought of as a generic cell controller which accepts tool independent coordinating instructions for controlling manufacturing operations, and generates tool independent operational instructions for controlling a manufacturing tool. The routine modules constitute generic to tool translators which translate the tool independent instructions and generate tool dependent operational instructions which are provided to the tool controller. This generic cell controller architecture provides interfaces to virtually any tool without requiring changes to the database structure or the existing routines. A new interface may be provided by simply generating one or more new routines and providing new data in the existing database structure.

BRIEF DESCRIPTION OF THE DRAWINGS

FIG. 9 illustrates a candidate relation set for the database of FIG. 2.

FIG. 11 schematically illustrates interaction of the internal timer module and the database of FIG. 2.

FIGS. 12A 12B, and 12C illustrate user menu screens for a user window of FIG. 5.

FIGS. 13A and 13B illustrates an example of a portion of the database of FIG. 2, during performance of an operation.

DESCRIPTION OF A PREFERRED EMBODIMENT

The present invention now will be described more fully hereinafter with reference to the accompanying drawings, in which a preferred embodiment of the invention is shown. This invention may, however, be embodied in many different forms and should not be construed as limited to the embodiment set forth herein; rather, this embodiment is provided so that this disclosure will be thorough and complete, and will fully convey the scope of the invention to those skilled in the art. Like numbers refer to like elements throughout.

Prior to describing the generic cell controlling method and apparatus of the present invention, a hierarchical description of a computer integrated manufacturing system will be provided. The general architecture of the generic cell controlling method and apparatus will then be described followed by a detailed description of each of the individual components thereof. Specific examples will also be provided. The descriptions of a computer integrated manufacturing system and the generic cell controller will use the example of a microelectronic manufacturing facility. However, it will be understood by those having skill in the art that the generic cell controller may be used in any computer integrated manufacturing system.

Overview of Computer Integrated Manufacturing System

The generic cell controller of the present invention is preferably used in a computer integrated manufacturing system. Accordingly, an overview of a computer integrated manufacturing system will be provided prior to describing the generic cell controller of the present invention.

Figure 1:
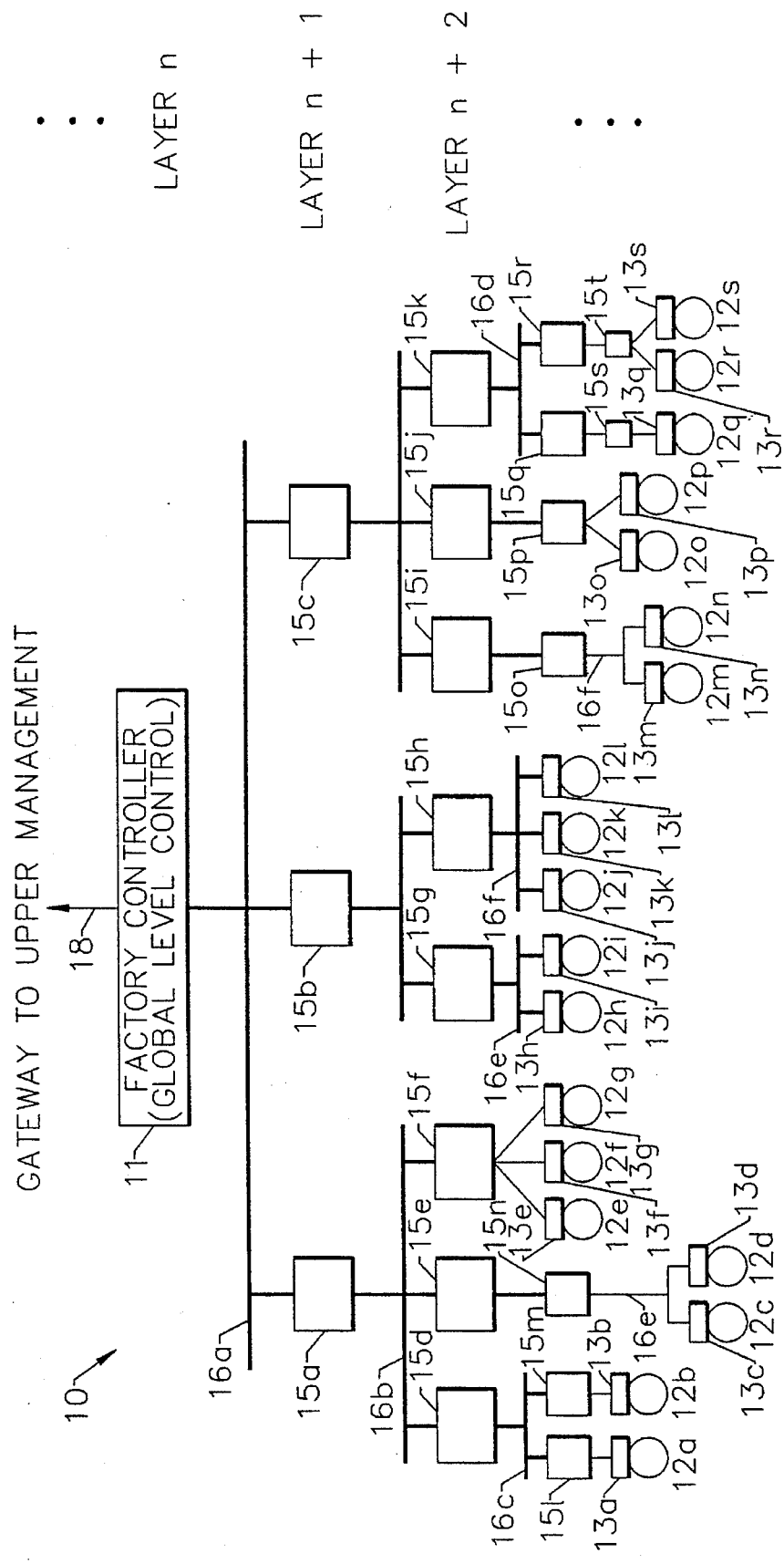
FIG. 1 illustrates a block diagram of a fully automated computer integrated manufacturing facility.

Referring to FIG. 1, a block diagram of a typical fully automated computer integrated manufacturing facility is shown. As shown, the computer integrated manufacturing system 10 has a strict hierarchical logical structure that is paralleled by a hierarchical control structure. At the top of the manufacturing hierarchy, a factory controller 11 acts as a global production facility controller and as a gateway to higher levels of factory management via interface 18. At the bottom of the hierarchy are the various tools or pieces of manufacturing equipment 12a–12s which are involved in manufacturing operations. Any number of tools may be provided. Each piece of equipment 12a–12s includes an associated equipment controller 13a–13s which controls the detailed operation of the equipment and provides network access to the facility hierarchy. The design of the tools 12 and controllers 13 vary widely, depending upon the particular manufacturing operation they perform. Moreover, tools and controllers from different manufacturers for performing identical operations will often differ widely in their design. Accordingly, there is a need to interface the factory controller 11 with the wide variety of tool controllers 13 which are available and which may become available in the future. It will be understood by those having skill in the art that tool controllers 13 are typically designed by the tool manufacturer, and cannot be significantly modified by the user.

Still referring to FIG. 1, a plurality of cell controllers 15a–15t are shown, in a hierarchical configuration, to interface the factory controller 11 with the tool controllers 13a–13s and thereby divide the complicated task of manufacturing an item. Any number of cell controllers 13 may be used, depending on system requirements. Each cell controller accepts commands from a parent cell controller or the factory controller, and implements these commands by instructing children units under its control. The children units may also be cell controllers or may be the tool controllers themselves. A cell controller is typically not involved in direct equipment control. The cell controllers may communicate with one another, with the factory controller and with the tool controllers using local area networks 16a–16f, and/or via direct connection. The design of local area networks 16 are well known to those having skill in the art and will not be described further herein. In the future it may be contemplated that all cell controllers will communicate via a heterogenous network using a common facility-wide communication language. Efforts are underway to implement such languages.

In the computer integrated manufacturing system of FIG. 1, each cell controller 15 must be uniquely designed to interface its particular parent and child. A significant programming effort is required to design each unique controller. Moreover, any update or rearrangement of the system is difficult.

Generic Cell Controller—Overview

The present invention stems from the realization that although the tasks assigned to the various cell controllers in the computer integrated manufacturing system may vary, all cell controllers have common basic functionality. Accordingly, the implementation of a cell controller that isolates the generic functionality common to all cell controllers, would significantly reduce programming effort as well as in the cost of facility start-up and update. Software portability would be increased while system complexity would be decreased.

Figure 2:
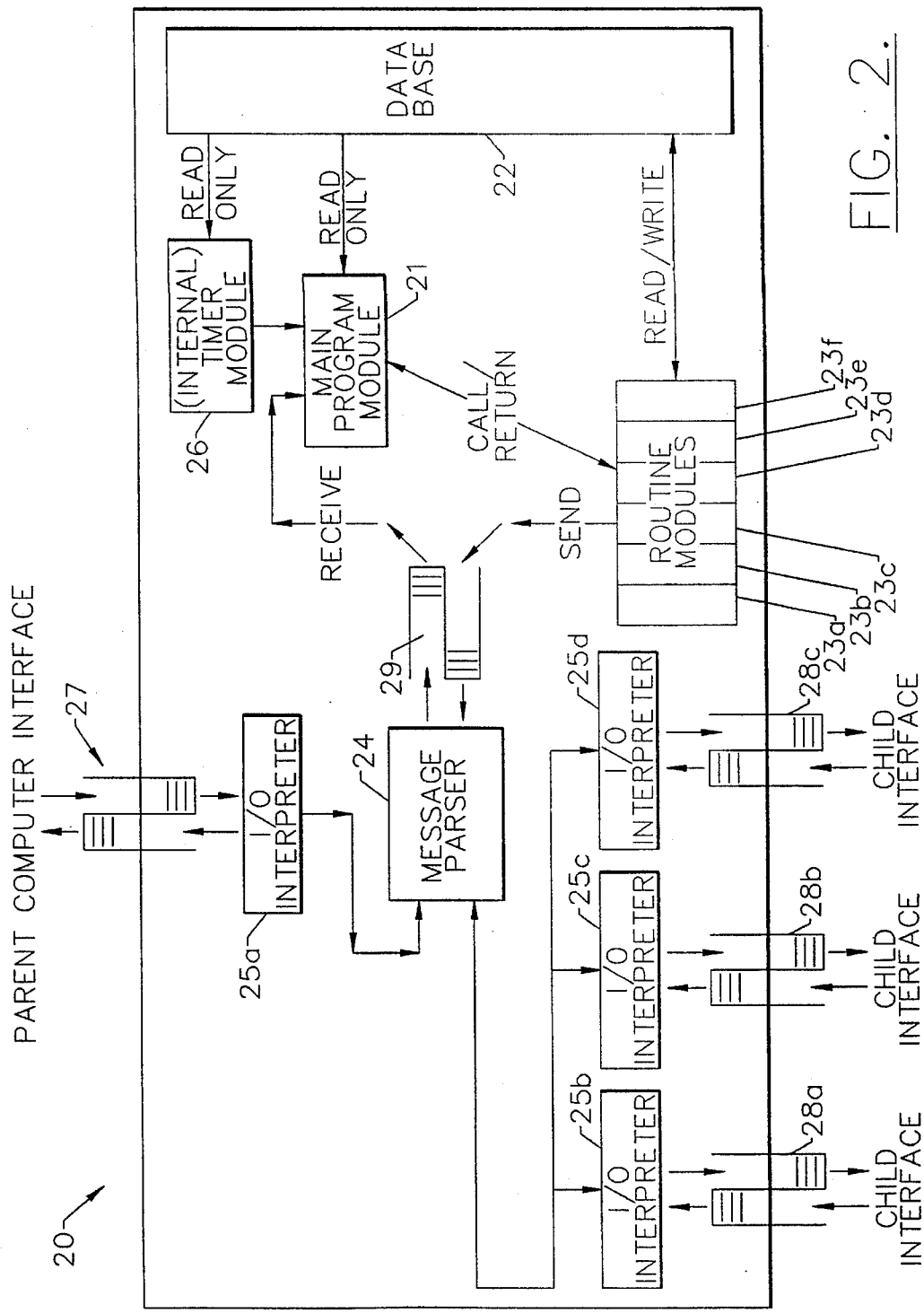
FIG. 2 illustrates a schematic block diagram of a generic cell controller according to the present invention.

Referring now to FIG. 2, a schematic block diagram of a generic cell controller according to the present invention is shown. It will be understood by those having skill in the art that generic cell controller 20 may be substituted for each cell controller 15a–15t of FIG. 1. It will also be understood by those having skill in the art that the generic cell controller 20 may be implemented as a stored program which runs on a general purpose data processor, such as an IBM AT personal computer or the equivalent. One or more parts of the controller 20 may also be implemented in special purpose hardware rather than software.

The generic cell controller 20 is a reactive device which begins its operations in an idle state. The generic cell controller 20 reacts to three sources of stimuli. The first is messages received from above via parent computer interface 27. The second is messages received from below from a child interface 28a–28c, each of which may interface to another generic cell controller or to an equipment controller. Any number of child interfaces may be provided, depending upon system requirements. The third source is an internal timeout, such as a timeout on a message transaction as provided by internal timer module In response to any of these stimuli, the cell controller parses the information, interprets the information and then takes action as a result. The cell controller then returns to an idle state. It will be understood by those having skill in the art that internal timer messages may be provided directly to main module 21, as shown in FIG. 2, or may be provided to main module 21 via message parser 24.

In particular, and still referring to FIG. 2, all messages which are received are stripped of control information which is specific to the communications protocol by input/output (I/O) interpreters 25a–25d. Accordingly, the generic portion of the cell controller is presented with messages which are preferably structured in a common facility-wide message format, and independent of a specific communications protocol. A message parser 24 makes use of the well defined structural properties of the message format to extract the data from the message. A main program module 21 receives the data from the message parser interface 24 and matches the data received to an entry in the database 22. As described in detail below, the database 22 is preferably structured so that the message format is embedded in its data dictionary. Accordingly, the database is capable of storing the data of any message that complies with the specified format.

Through relations implied by the database 22, the main program module 21 determines the unique action to take as a result of a message received or as a result of an internal timer expiration. Also through relations implied by the database, each appropriate action may be invoked in the proper sequence. In order to invoke an action, the main program module 21 first scans the database to determine the necessary routines to call, the parameters to pass to the routines and the order in which to call the routines. The main program module 21 then serially calls selected ones of the routines 23a–23f, in the specified order and with the specified parameters.

It will be understood by those having skill in the art that any number of routines 23 may be provided, depending on the system requirements. A routine may update the database 22. A routine may also send message data, derived from the database, back to the message parser 24 to be formatted and forwarded to an I/O interpreter 25, so that message data may be communicated in the specified format and appropriate communication protocol to a parent or a child controller. Upon return of control to the main program module 21 from the routines called the cell controller returns to an idle state.

It will be understood by those having skill in the art that the main program module 21 and the database 22 produce a generic sequence of steps to be performed by a selected tool in order to implement a selected manufacturing operation. The routine modules 23 act as generic-to-tool translators for generating operational instructions for the selected tool controller. The main program module 21 operates in the same manner, described in detail below, for all generic cell controllers. The structure of database 22 is also the same for all generic cell controllers, although the data contained in the database will typically vary. Similarly, many of the routine modules 23a–23f will be applicable to more than one child interface 28. When a new interface is desired, a new I/O interpreter may need to be designed and one or more new routine modules may need to be designed. However, the overall architecture of the controller remains the same as does the design of main program module 21, database 22, message parser 24, and internal timers 26. Generic functionality is thereby preserved.

Figure 3:
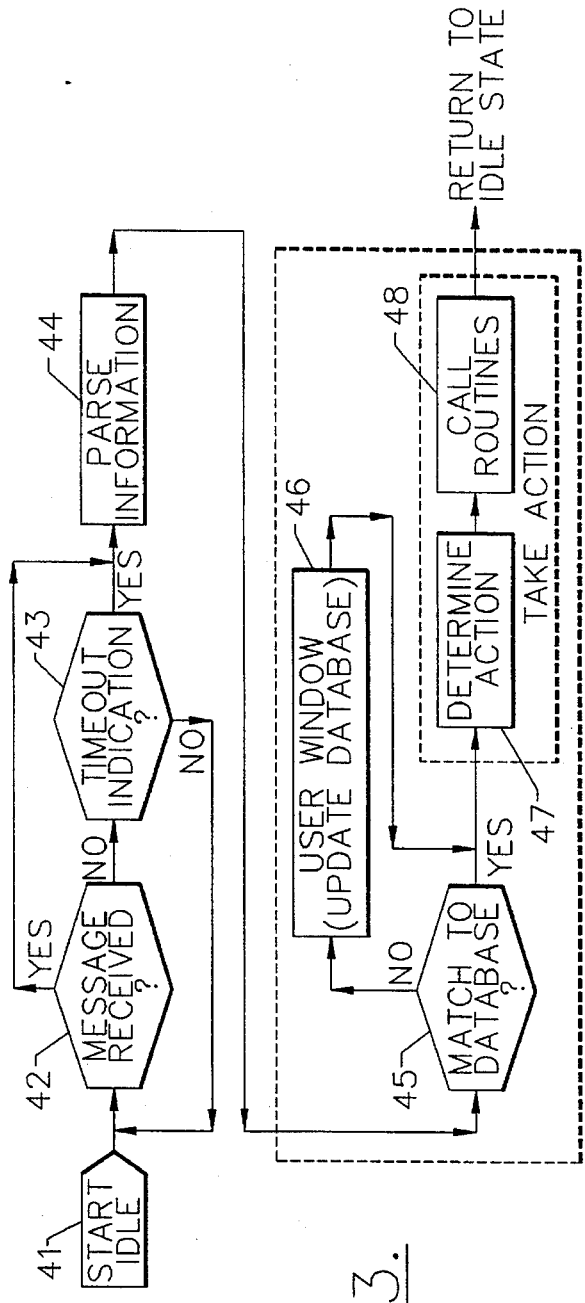
FIG. 3 illustrates the operational steps performed by the generic cell controller of FIG. 2.

Referring now to FIG. 3, the overall operation of controller 20 of FIG. 2 is illustrated. As shown, operation begins in the idle state at block 41. When a message is received from an I/O interpreter 25, at block 42, the message parser 24 parses the information, at block 44, to obtain the generic information and eliminate the communications protocol control information. Similarly, if a timeout indication is received from internal timer 26, at block 43, the information is also parsed at block 44 by internal timer 26.

Once the information is parsed, the main program module 21 determines whether there is a match to the database 22, at block 45. Typically there will be a match to the database. Based on the match, the main program module 21 determines the action to be taken, at block 47, and calls the appropriate routines 23a–23f, at block 48. Control then returns to the idle state at block 41.

In view of the above description, it will be understood that the flow of controller information is uncomplicated and well defined because the sources of controller stimulation are well defined, and much of the control information is embedded in the structure of database 22. It will also be understood that the system is heavily data driven. Indeed, all events result from data received from a parent interface 27 or a child interface 28, or from a timeout on data expected via internal timers 26. Thus, the database component of the controller plays a large role in determining controller operation.

Still referring to FIG. 3, the generic cell controller may also include a user window operation at block 46, in order to update the database when a match to the database is not found. In particular, one of the routine modules 23 may serve as an interactive window to application modules such as expert systems or simulation software, or directly to a human user. A user interface routine may be invoked when a correctly formatted received message does not have a match in the database. The user interface routine can determine the course of action from the user and may update portions of the database accordingly. Thus, the cell controller information can be modified while the controller is operating so that it adapts to new stimuli. The interactive window interface teaches the controller how to react to new stimuli.

Intermediate Level Description

As a bridge between the detailed description of each component of cell controller which follows, and the general description provided above, an intermediate level description of the components of FIG. 2 will be provided.

I/O Interpreter 25

The I/O interpreter 25 converts protocol specific information into information with a specified facility-wide message format. The I/O interpreter also isolates most of the functionality of the controller from the communication protocol's specific information. Thus, the I/O interpreter 25 isolates the generic cell controller from the facility communications protocol. Because of the modular nature of communication protocols, the interpreter module generally strips off protocol control information from incoming messages and encapsulates outgoing messages with protocol control information.

One example of a message wide facility communications protocol for semiconductor manufacturing systems is part II of the SEMI Equipment Communications Standard Message Content (SECS-II) protocol as described in the 1989 SEMI standards, Vol. 2, Equipment Automation, published by Semiconductor Equipment and Materials International. In such an environment, the I/O interpreter module 25 provides a two-way translation between SECS-II formatted messages and those messages encased in communication protocol specific control information. Thus, the message parser 24 receives SECS-II information only.

Message Parser 24

Message parser 24 formats and deciphers information with a specified facility-wide message format. In a semiconductor manufacturing environment where the facility-wide format is SECS, the message parser is a SECS parser which formats and deciphers SECS-II formatted message information. It presents data from a SECS-II message to the generic portion of the controller and formats data received from that portion of the controller into SECS-II messages.

Main Program Module 21

The main program module 21 coordinates all activity of controller 20. The main program module receives parsed message information from the three sources of stimuli described above. For each message stimulus, the module uses the database 22 to interpret the message stimulus and to determine a series of actions to be taken; i.e. the action routine modules 23 to be called. The main program 21 then calls the specified routine module(s) in the order and with the parameters specified by the database. Upon return from these routine module(s), the main program module returns to the idle state. The main program module preferably directs all activity within the controller, and preferably derives all of its coordinating information from the database. The controller's control structure is embedded in the database.

Database 22

The database 22 is the central source of information for the controller 20. Database 22 contains the necessary information so that the main program module 21 can match any valid incoming message to a database entry. The database also relates message information to actions to be taken and routines to be called. Many different database structures may be used for the present invention. However, in the preferred embodiment, an entity relationship technique is used to model the data storage. An in depth presentation of the entity relationship approach may be found in an article by Teorey et al. entitled *A Logical Design Methodology for Relational Databases Using the Extended Entity-Relationship Model*, published by ACM Computing Surveys, Vol. 18, No. 2, June, 1986, the disclosure of which is hereby incorporated herein by reference. The entity relationship approach was applied to automated semiconductor manufacturing in an article entitled *An Application of Entity Relationship Data Modeling Techniques to the Automated Manufacturing Process*, coauthored by the present inventors and Teorey and published in the Proceedings of the Second International Conference on Data and Knowledge Systems for Manufacturing and Engineering, October, 1989, pp. 206–215, the disclosure of which is hereby incorporated herein by reference.

Figure 4:
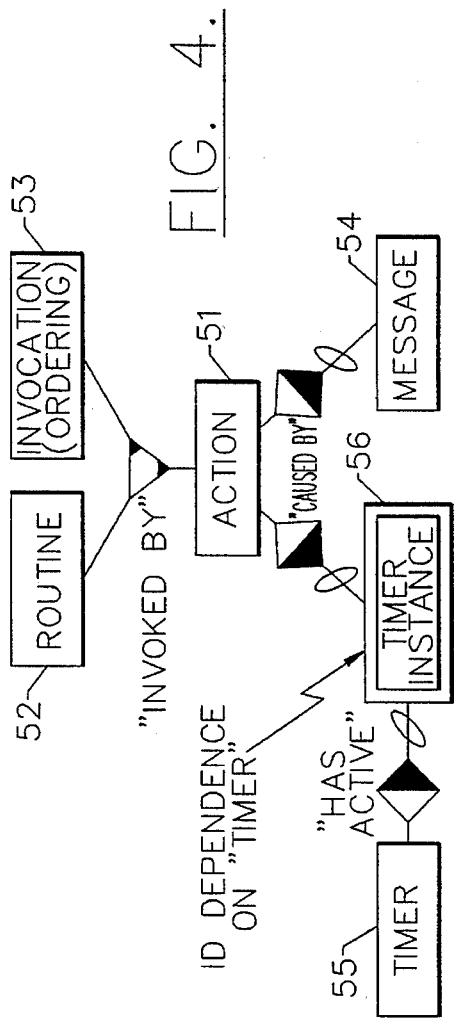
FIG. 4 illustrates a generalized entity relationship model of the database of the generic cell controller of FIG. 2.

The general structure of a preferred embodiment of the database 22 of the present invention is indicated by the entity relationship diagram of FIG. 4. As shown in FIG. 4, a unique action 51 results from a message 54 received or a timer 55 which expires and which interacts with a timer instance table 56. Many messages may determine the same action but each message determines exactly one action. Similarly, many timer expirations may determine the same action, however, a timer expiration results in exactly one action. In other words, the relation of the stimulus to the action is many-to-one because the stimulus must uniquely determine the course of action but an action can result from a variety of stimuli.

An action in turn may result in a set of routines 52, corresponding to the routine modules 23 of FIG. 2, which are called with the specified parameters and in a specified order. An action 51 determines a set of routines 52 to be called with parameters in a specified invocation order 53. In other words, an action 51 and an invocation 53 together determine a routine 52 which is called. Thus, as indicated in FIG. 4, there is a ternary relation between the entity's action 51, routine 52 and invocation 53.

The database 22 provides the capability to store the information of any message to be sent or received by the controller 20. This requirement impacts the design of the message storage portion of the database. The database schema incorporates the entire message structure definition into its data dictionary. The result is that any message with that message structure definition can be stored in the database. However, the structure of the database is independent of the message data itself and is therefore generic to the facility. In a semiconductor manufacturing facility controller database, where the facility message format is SECS-II, the database schema for the generic cell controller is developed such that it can store any SECS-II formatted message. The details of such a database will be described below. However, the model has the same basic structure as the simplified model illustrated in FIG. 4.

With the controller database model developed, existing techniques can be applied to derive a set of database candidate relations, as described in the Teorey et al. article cited above. These relations are termed "candidate" relations because they represent a set of relations that may be modified as further information about the relations is realized. The set of candidate relations and their necessary parameters are listed in FIG. 9.

Referring to FIG. 9, it can be seen that the "Message" relation is uniquely identified with a message number, and also with a composite set of the attributes of Stream#, Function#, and Instance. The Stream# and Function# parameters are used to identify a specific SECS-II message type, while an Instance parameter is used to identify a particular occurrence in time of that type. Message contains a parameter Action# which cannot be null. It must contain a value because a message should always cause some action, although the action may be "no operation". The List and Item relations contain the SECS-II data in atomic form. The structure of connection between these relations and the Message relation is a function of the format of SECS-II messages, and will be described in detail below.

The Action relation provides the link between Message and Routine. The Invoked_By relation is derived from the ternary relationship between Action, Invocation, and Routine. Since Action and Invocation together determine Routine, this relation is uniquely identified by a composite set of parameters of Action#, Invocation# and Routine#.

It will be understood by those having skill in the art that although the above described database design is tailored for the recognition of SECS-II message information in an automated semiconductor manufacturing facility, much of the basic data structure is similar in semiconductor manufacturing hierarchical facilities with a different message format and in general computer integrated manufacturing systems.

Routine Modules 23

These modules contain the functionality necessary to implement the details of the controller actions. These routines are called by the main program module 21 as shown in FIG. 2. Using information stored in the database 22, the main program module determines which routines to call, the order in which to call the routines and the parameters to pass to the routines. The invocation of a routine will result in one of two actions which will now be generally described.

In the first type of action, the database 22 is modified. Entries may be added, deleted or modified. For example, the data parameter of the message may be altered to reflect a recipe change in the semiconductor manufacturing process. A timer instance may be created to reflect the fact that a request message has just been received and no reply yet sent. It will be understood that the routine modules 23a–23f are the only modules that can alter the data in the database because all actions including database updates are implemented through calls to routines.

In the second type of action, a message is sent to a higher level or lower level controller. The routine 23 may access the database 22 to determine the data to be sent in the message. The routine then passes the information to the message parser 24 where it is formatted, for example into a SECS message. It should be noted that the routine modules 23 are the only modules that invoke the sending of a message to any source outside the controller. The individual routine modules 23a–23f implement the details of actions that result from stimuli to the controller.

Advantages of the Generic Cell Controller

Having described the architecture of the generic cell controller and the individual components thereof, the advantages of the generic cell controller will now be described. In the architecture which has been described, all nongeneric information from outside stimuli is removed by the I/O interpreters 25, so that the resulting cell controller design maximizes generic attributes. The controller functionality is common to all cell controllers in the facility. Therefore, much of the programming effort may be shared, to reduce duplication of effort.

In addition to maximizing generic attributes and reducing duplication, the modular properties of the generic cell controller produce other advantages. The main program module 21, that coordinates all generic cell controller activity, is preferably a software module that is well defined, uncomplicated and small in size. Thus, the operation of the cell controller is easy to characterize.

Moreover, because of the defined boundary between routine modules 23a–23f, the update of any one module preferably has minimal if any impact on the rest of the system. For example, specific tasks to be conducted by the cell controller are implemented in well defined modular routines. The routine modules 23 do not impact any other programming in the cell controller because they do not access any programming code outside the routine module itself. Thus, they are very portable. They do not even impact the procedural code of the main program module, because the routine name and parameters called from the main program module are determined from the database. Accordingly, if a routine is added, deleted or modified, it will preferably only impact the cell controller database 22. No procedural code outside that routine is impacted.

Also, because many tasks are common to all cell controllers, the same routines will typically exist at many different cell controllers. For example, one such common routine module provides the interactive window 46 when the controller has no database match to a received message. The controller can thereby learn in real time, and thereby update its database.

The controller design is adaptable to either a single tasking or a multitasking environment, because the various routine modules operate independently, with their only interaction being indirectly through the database 22. Thus, only the database need be accessed serially, and the routines may be executed in parallel. Preferably, database locking mechanisms are employed to insure integrity in a multitasking system.

The database design also takes advantage of the structured property of the messages. The data dictionary for the database is a function of the constant message format specification and preferably has no dependence on the data itself.

Thus, the database schema is generic to all cell controllers in the facility. All data of any message with the specified format can be stored in the database.

Further, since the database information is used to determine controller actions and therefore which routines to call, isolation is achieved between main program module and the routine modules. Isolation is also achieved among routine modules. This isolation further enhances the modular properties of these modules, thereby increasing software portability and decreasing start-up and update costs. It will be understood by those having skill in the art that many of the advantages resulting from the database design are based on the fact that it is much easier to update data in a database than to update programming code. With the design described above, any module modification impacts only the database data and the module itself, with the database structure being constant and all the other modules being unaffected.

The generic cell controller of the present invention may be implemented on a stand-alone personal computer such as an IBM AT or similar computer. The same generic controller design may be used at all locations in the computer integrated manufacturing system of FIG. 1. In a semiconductor manufacturing environment, the facility-wide communication language message format may be SECS-II. The SECS message parser 24 may be implemented through use of a commercially available SDR-SECS driver software marketed by G. W. Associates, Sunnyvale, CA. The database is preferably relational and preferably complies with the data model of FIG. 4, and may be accessed through "C" language macros and function calls in the cell controller operating software.

The cell controller software is generic because the same controller software package exists for each cell controller. The only procedural code differences lie in the routine modules 23 at each cell controller. The generic cell controller software, which consists of the main program module and SECS message parser is quite small. In one embodiment, the executable code is approximately 14% of the database size. The database structure and the data dictionary are also the same for each cell controller implementation. The only difference between the cell controller databases is a portion of the data they contain.

The design of the generic cell controller features a large database with a generic structure that embeds most of the system control information. Thus, the control mechanism is guided largely by data in the database, rather than procedural code. This results in a cost effective method of cell control and modification, because it is easier to update data in a database than to modify procedural code.

A detailed description of the major components of the generic cell controller of FIG. 2 will now be provided.

Detailed Description: I/O Interpreter 25

The I/O Interpreter 25 (FIG. 2) translates protocol specific information into information with a specified facility wide message format. The I/O interpreter thereby isolates most of the functionality of the controller from communication protocol specific information.

As shown in FIG. 2, information enters the generic cell controller 20 via communication interfaces 27. A communication protocol defines the method by which application information is communicated to/from each interface. Part of the function of the I/O interpreter is to effect the transfer of information at a communication interface.

Figure 5:
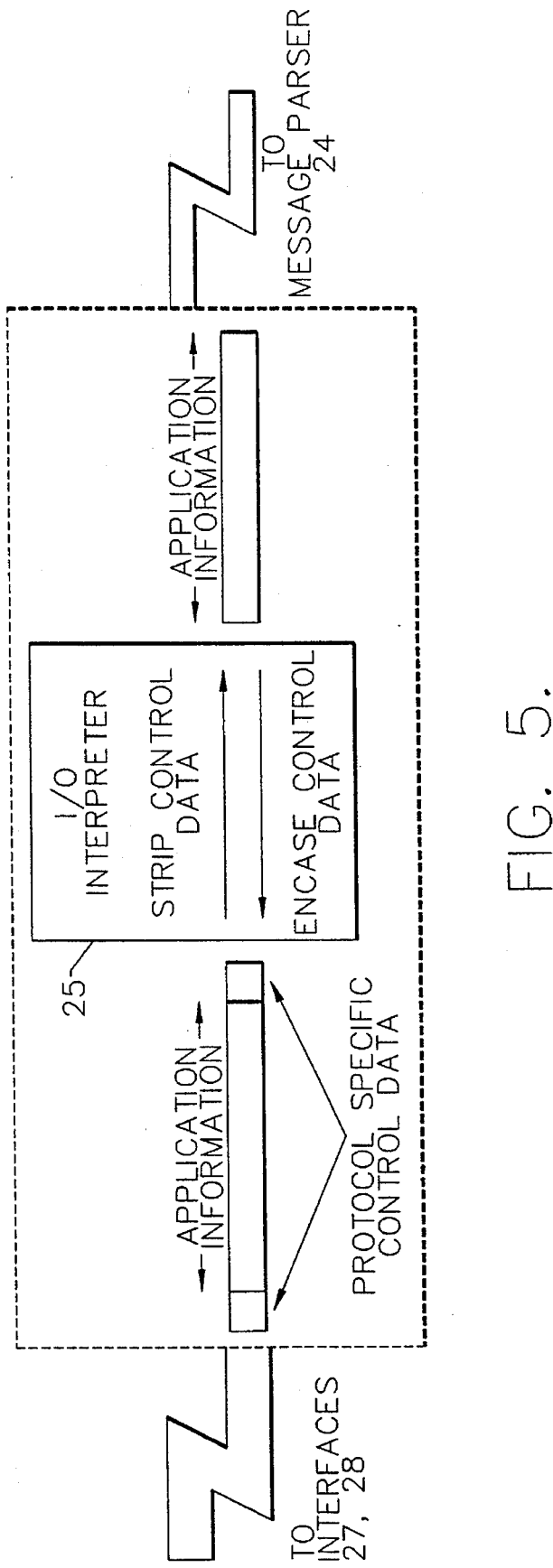
FIG. 5 illustrates the detailed operation of the I/O interpreter module of FIG. 2.

A detailed functional block diagram of an embodiment of an I/O interpreter is shown in FIG. 5. The application information is usually encapsulated in protocol specific control data for communication purposes, as shown in FIG. 5. The I/O Interpreter module strips this protocol specific information from incoming data, thereby leaving the application information, and encapsulates outgoing application information with the appropriate protocol specific information for transmission.

As an example, in automated semiconductor manufacturing, the common message format is SECS-II. The controller interpreter module provides a two-way translation from SECS information over a communication network to SECS-II formatted messages. The communication network may be any ISO network, Ethernet, RS-232, etc. The communication hardware (e.g. an RS-232 communication board) may be considered part of the I/O interpreter. The I/O interpreter presents/accepts application level information to/from the Generic Cell Controller that is independent of the communication protocol through which it was/will be communicated.

Detailed Description: Message Parser 24

Message Parser 24 (FIG. 2) formats and deciphers information with a specified facility wide message format, as received from the I/O interpreters 25. For data entering the Controller 20, message parser 24 takes the information and converts it into a structure suitable for interpretation by the main program model 21. For data leaving the Controller 20, message parser 24 converts data into a structure suitable for interpretation by the main program, and converts the data into a data stream that complies with the facility-wide message format.

For example, in a semiconductor manufacturing facility, the facility wide format is assumed to be SECS. A message parser 24 in this environment is a SECS Parser. A SECS Parser formats and deciphers SECS-II formatted message information. It presents data from a SECS-II message to the main program module of the controller (see FIG. 2) and formats data received from that portion of the controller into SECS-II messages. As a specific example, suppose an equipment controller is reporting its model number and software revision number to the controller 22 using a SECS Stream 1 Function 2 Message. Suppose the model number is "EQUIP1" and the revision number is "Ver1.0". The incoming SECS message would be of the format:

Message (Stream 1, Function 2)
 List of two items
  Item 1=Model number="EQUIP1"
  Item 2=Version number="Ver1.0".

Figure 6A:
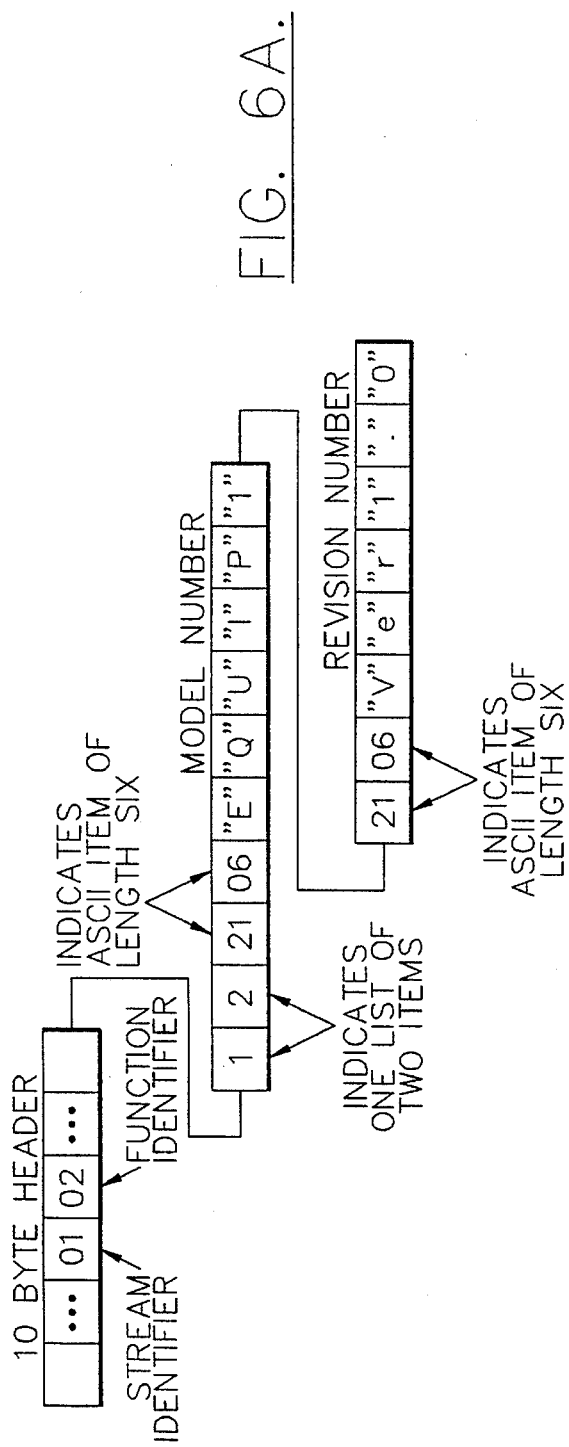
FIGS. 6A and 6B illustrate a detailed example of the operation of the message parser of FIG. 2, for a model and software revision number report.
Figure 6B:
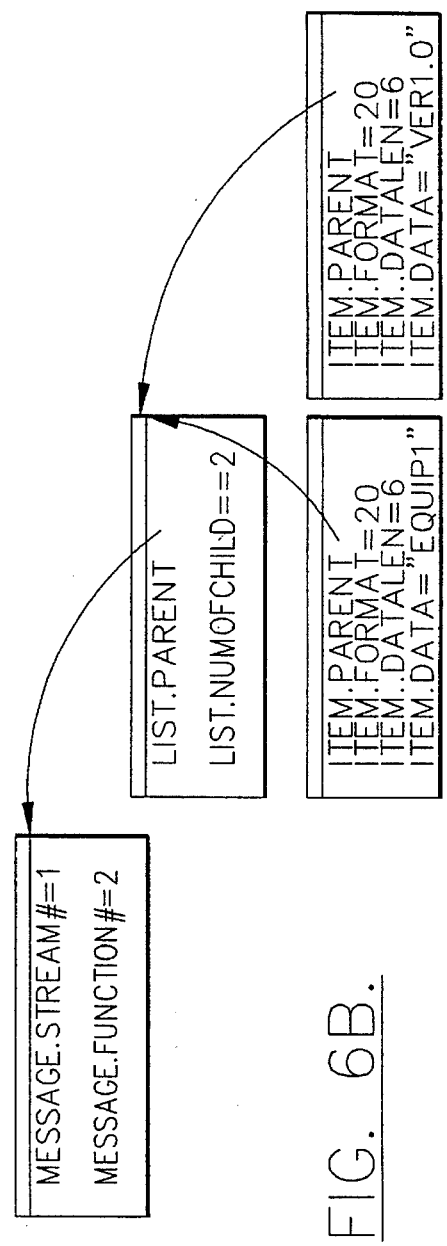

The message data stream would be of the format shown in FIG. 6A. If the main program module 21 defines the message information in a link list format, the message in question may be stored in the format shown in FIG. 6B. Message parser 24 converts the data stream of FIG. 6A into the data structure of FIG. 6B. If the message were outgoing, the function of the message parser would be reversed.

With common messaging protocols, there may be commercially available software packages that contain much of the functionality of the message parser. In general, however, functionality may need to be added to a package so that information presented at its user interface is compatible with the message storage structures defined by the main program module.

Detailed Description: Main Program Module 21

The Main Program Module 21 (FIG. 2) coordinates all generic cell controller activity. Its functionality is simple and well defined. This module is event driven, reacting to messages from its parent, messages from its children, and internal timeout events. For each stimulus event, the module uses the database 22 to interpret the message stimulus and determine the action to be taken, i.e., the routine modules 23 to be called. The main program module then calls the specified routine module(s) in the proper order, and with the parameters specified by the database. Upon return from these routine module(s) the main program module returns to a state of rest/idle.

Figure 7:
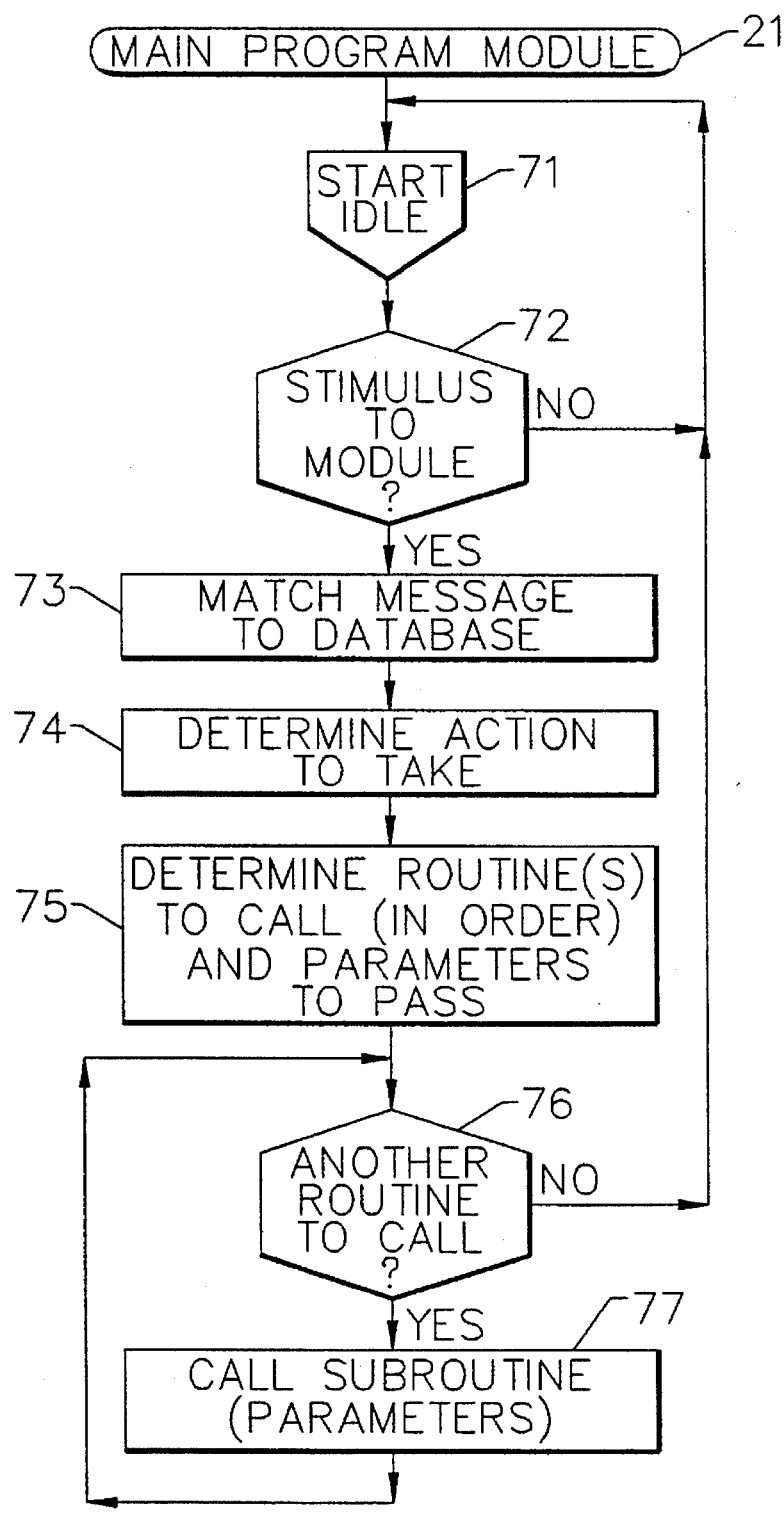
FIG. 7 illustrates the operational steps performed by the main program module of FIG. 2.

FIG. 7 illustrates the operational steps performed by the main program module. As shown at block 71, the main program module is a reactive, event driven module. Thus when no event stimulus is received and all (previous) stimulus reaction transients have ended, this module remains in an idle state, continuously checking for an event stimulus.

When in an idle state (block 71), the main program continuously checks for an incoming stimulus (parent, child or timeout event) at block 72. All message events received have been parsed by the message parser and saved as message information in a structure defined in the main program module. All timeout events are received from the internal timer module 26. If no stimulus is detected, the module continues to poll (blocks 71 and 72). If an event is detected the main program module "wakes up" and services the event.

Incoming event detection may be accomplished using a mailbox mechanism. A memory location may be designated as a mailbox, accessible by the message parser module, the internal timer module, and the main program module. The mailbox is normally empty (has a null value) and is polled by the main program module. When an incoming event is parsed by the message parser into the appropriate structured variable instance, or when the internal timer module detects a timer event, the mailbox flag is raised and an address in the mailbox points to the variable instance containing the message or timeout information. Upon receiving the information at its next poll, the main program module clears the mailbox message/timeout pointer to lower the mailbox flag.

Referring to block 73, the main program module services event stimuli by matching the information of the event to information in the database 22 and, through relations implied by the database, taking the appropriate action. Thus, when the main program module has detected that an event stimulus has occurred, it must first attempt to find a match of the information associated with the event as an entry in the database. The method in which message information is stored in the database (i.e., the database schema) is dependent on a variety of factors including the message format specification, the database management system used, as well as user storage, performance and interface objectives. Timeout information stored in the database is not dependent on any facility-wide format specification, because the information is internal to the generic cell controller. For either case, the main program module contains an algorithm that will search through the database and indicate a match between stored information and the current message associated with the event. This algorithm will be a function of the database schema as well as the event data structure and the message protocol.

The interaction of the main program module with the database is described further below. An example that illustrates matching the message to the database where the messaging format is SECS, and the matching of a timeout event to the database will be described below.

Referring again to the description of FIG. 7, each message and timer instance stored in the database is linked to a single action identified by an action number, as described below. After the main program has found a match between the incoming event (message or timeout) and an entry in the database, it retrieves the associated action number (block 74).

In the database, each action (identified by an action number) is associated with, or linked to, one or more routines (each identified by its routine number), and a set of parameters to be passed to each routine. After the main program has determined an action number in response to the incoming event (block 74), it retrieves the associated routine numbers and parameters (block 75). It then compiles an ordered list of routines to call, and the parameters to pass with each call. An example of such a list is indicated in Table 2 below. In this example the action to be taken is action number five. The purpose of this action is to read the values of two sensors on a piece of equipment and store them for later use. Four routines are to be called to implement this action: (1) "Initialize()—no parameters"—wakes up the piece of equipment; (2) "GetData(Ch, 1, 2)"— sends a message to the equipment requesting the values of channels 1 and 2; (3) "PollACK(Val__1, Val__2)" polls the equipment for a response message containing the sensor values "Val1" and "Val2"; and (4) "updates DB(1, Val__1, 2, Val2)" updates the database with the new values of channels 1 and 2.

TABLE 2

| Action# | Order# | Routine# | RoutineName | Parameters |
|---------|--------|----------|-------------|------------|
| 5 | 1 | 6 | Initialize | None |
| 5 | 2 | 5 | GetData | Ch,1,2 |
| 5 | 3 | 11 | PollACK | Val__1,Val__2 |
| 5 | 4 | 2 | UpdateDB | 1,Val__1,2,Val__2 |

From the compiled, ordered list of routines to call at block 75 above, the main program module takes the necessary steps to implement the action indicated. This is accomplished by calling each routine in the list in order with the indicated parameters (block 77). In the example relating to Table 2, the routines "Initialize" "GetData" "PollACK", and "UpdateDB" are called in order and the values of equipment channels 1 and 2 are read and updated in the local database.

After control has returned from the last routine called in the ordered list (block 76), the main program module returns to an idle state (block 71), polling for the next event stimulus.

Detailed Description: Database 22

The Database 22 (FIG. 2) is the central source of information for the controller. The database contains the necessary information so that the Main Program Module 21 can match any valid incoming message or timeout event to a database entry. The database also relates message and timeout information to actions to be taken and routines to be called. The general structure of such a database is indicated by the Entity Relationship (E-R) diagram of FIG. 4. The Entity Relationship technique is commonly used to model data storage systems and is well known to those having skill in the art. However, for the sake of completeness, a brief tutorial on the E-R modeling technique will now be given.

Figure 8:
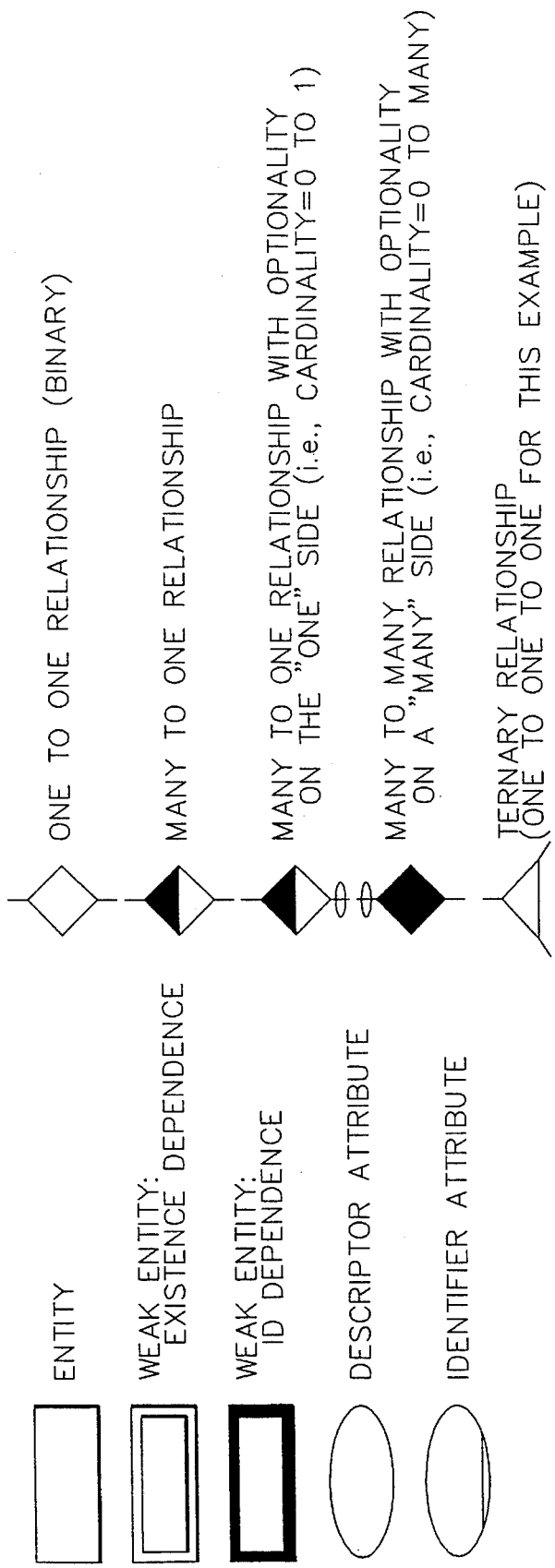
FIG. 8 schematically illustrates the modeling semantics of entity relationships.

The E-R approach to database modeling provides semantics for conceptual design of databases. With the E-R approach, database information is represented in terms of entities, attributes of entities, and relationships between entities, where the following definitions apply. The modeling semantics corresponding to each definition are illustrated in FIG. 8.

Entity: A principal object about which information is collected. For example, in a database containing information about personnel of a company, an Entity might be "Employee". In E-R modeling, an Entity is represented with a box. An Entity may be termed Weak or Strong, relating its dependence on another entity. A Strong Entity exhibits no dependence on another entity, i.e. its existence does not require the existence of another Entity. As shown in FIG. 8, a Strong Entity is represented with a single unshaded box. A Weak Entity derives its existence from another Entity. For example, an Entity "Work Time Schedule" derives its existence from an Entity "Employee" if a work time schedule can only exist if it is associated with an employee. As shown in FIG. 8, a Weak Entity is represented by concentric boxes. A Weak Entity may also be ID dependent on another Entity, i.e., in addition to its existence, an Entity may also derive its identity from another Entity. For example if "Work Time Schedule" contained the parameter "Employee#" as part of its composite key, then "Work Time Schedule" would be ID dependent on "Employee". ID dependence is represented by shading the outer box of a Weak Entity, as shown in FIG. 8.

Attribute: A label that gives a descriptive property to an Entity, e.g., name, color. Two types of Attributes exist. Identifier Attributes distinguish among occurrences of an Entity, for example social security number. Descriptor Attributes merely define an Entity occurrence, e.g., gender, weight. As shown in FIG. 8, in E-R modeling, an Attribute is represented with an oval tied to the Entity (box) to which it pertains. In many cases, Attributes are not included in the E-R model.

Relationships: A Relationship is a connectivity exhibited between Entity occurrences. Relationships may be one to one, one to many, and many to many, and participation in a Relationship by an Entity may be optional or mandatory. For example, in the database containing information about personnel of a company, a relation "married to" among Employee Entity occurrences is one to one (if it is stated that an employee has at most one spouse). Further, participation in the relation is optional as there may exist unmarried employees. As a second example, if company policy dictates that every employee have exactly one manager, then the Relationship "managed by" among Employee Entity occurrences is many to one (many employees may have the same manager), and mandatory (every employee must have a manager).

As shown in FIG. 8, in E-R modeling a Relationship is represented with a diamond if it relates one or two Entities, and is represented with an n-sided polygon if it relates more than two Entities. Connectivity in a Relationship is denoted with shading of the diamond; a connectivity of "one" is denoted with the appropriate portion of the diamond unshaded while a connectivity of "many" is denoted with the appropriate portion of the diamond shaded. Optionality of Entity participation in a relationship is indicated with a ring around the line segment between the entity and the relationship. A detailed description of E-R model semantics, extensions and E-R modeling techniques may be found in the Teorey et al. article cited above.

Referring again to FIG. 4, the structure and use of the database will be described in detail.

The database contains the seven Entities: "Routine" 52, "Invocation" 53, "Timer" 55, "Timer, Instance" 56, "Action" 51, and "Message" 54, related as shown in FIG. 4.

A set of candidate relations (or tables) comprising a relational database schema can be derived from the model using well documented techniques. In the basic implementation, each of the Entities would be a table in the controller database 22. Further, the relationship "Invoked By" would also be a table in the database. Relationships between these Entities would be implemented as foreign keys in the relational tables. FIG. 9, described above, is an example of such a basic schema. Note that Keys and Foreign Keys of tables are indicated. In the following paragraphs, each entity/relationship resulting in a table (or tables) in FIG. 9 is described in detail.

1) Message: The database table or tables corresponding to this entity store information about every message event stimuli that the controller is expected to receive. This includes messages from its parent controller and messages from child controller(s). Upon detecting a message event, the Main Program Module 21 services the event by first attempting to find a match between the message event and an instance of the Message entity in the database 22. If a match is found, the main program module can determine (also from the Message entity instance) a unique action number that serves as a key in determining an action to take to service the event.

The database preferably provides the capability to store the information of any message to be sent or received by the controller. This impacts on the design of the message storage portion of the database. The database schema incorporates the entire message structure definition into its data dictionary. The result is that any message with that message structure definition can be stored in the database, however the structure of the database is independent of the message data itself and is therefore generic to the facility.

Figures 10A, 10B:
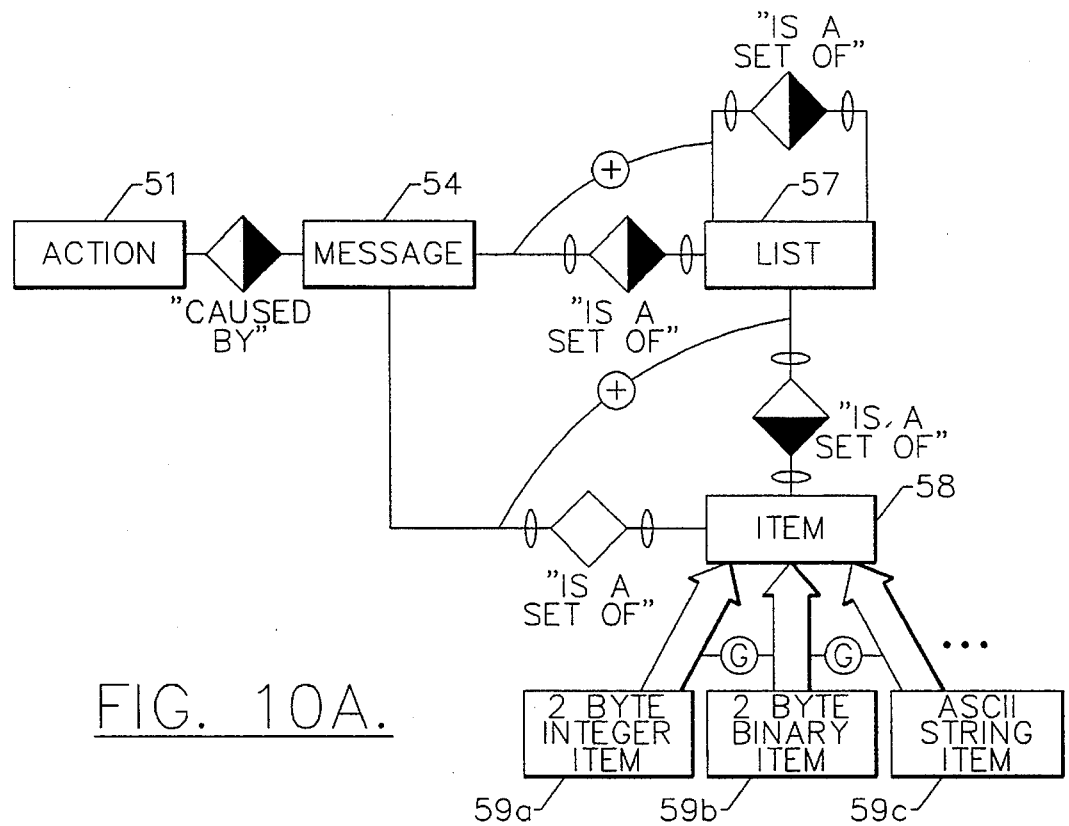
FIG. 10A illustrates a detailed entity relationship model of the message portion of the database of FIG. 2.
FIG. 10B illustrates the database schema resulting from the detailed message model of Figure 10A.

In the message portion of the automated semiconductor manufacturing controller database, the facility message format is preferably SECS-II. Thus, the database schema for the controller in the semiconductor manufacturing arena can store any SECS-II formatted message. FIGS. 10A and 10B illustrate an implementation of the message entity for a controller where the facility-wide message format is SECS-II. FIG. 10A is a detailed E-R diagram of the complex entity while FIG. 10B is an illustration of the resulting schema.

Referring to FIGS. 10A and 10B, the Message relation 54 is uniquely identified with a Message#, but also with a composite key of Stream#, Function#, Source, and Instance parameters. A message type is usually not sufficient to uniquely describe a message. In general, the message type, along with the message data and perhaps even the message source, are needed to determine uniqueness of a message. Every parameter that is used to determine uniqueness of a message by definition must be part of a composite key of the Message relation. In this example, Stream# along with Function# identify the message type, Source identifies the message source, and Instance delineates unique occurrences of message data for a message type from a message source.

Message_Number is also inserted as a candidate key of this relation because it is easier to deal with than the composite candidate described above. The Message relation also contains the foreign key of Action #. This foreign key indicates the "one-to-many" relationship between the Action entity 51 (described below) and the Message entity 54. This foreign key indicates the unique action to be taken by the generic cell controller upon the detection of a particular message event. Preferably, the foreign key of Action# cannot be null, i.e., every message event must correspond to an action (which may be "no action").

The List and Item relations, 57 and 58 respectively, are related to the Message relation 54 in a hierarchical fashion reflecting the hierarchical structure of the messages. In general, the detail of the message storage structure reflects the message structure protocol.

The List relation 57 contains the foreign keys of Parent_List# and Parent_Message#, reflecting the fact that a list has a parent list or parent message. The fact that a list must have exactly one parent results in the specification for this relation that exactly one of the List foreign keys (of Parent_List# and Parent_Message#) is not null for each entry in List, as indicated by the exclusive OR Extended E-R construct.

The Item relation 58 contains the foreign keys of Parent_List# and Parent_Message#, reflecting the fact that an item has a parent list or parent message. Since an item must have exactly one parent, in the specification for this relation exactly one of the Item foreign keys (of Parent_List# and Parent_Message#) is not null for each entry in Item.

The Item relation 58 has a Format parameter to indicate the Item data type and Data_Pointer and Data_Length parameters to locate the actual item data. The actual Item data may not be stored in this table due to undesirability of storing variable data types in a relational structure. In general, depending on the types of message data elements, these elements may or may not be directly stored in one data item table. They may be stored in separate tables 59a–59c as generalized subsets of the item set as exemplified in FIGS. 10A and 10B.

2) Timer: Referring again to FIG. 9, this relation contains information on all possible timers that may have instances managed by the controller that may indicate timeout events. Note that in the embodiment of FIG. 2, this table is not accessed by the Main Program Module 21 in servicing an event, as it does not contain direct information on currently active instances of timers. The Timer table contains information on timers that may not be presently involved in the "has active" relationship. Thus, deletion of this table could result in loss of information.

As an example, a "Conversation Timer" may be defined in the Timer table and may be used to monitor the timely receipt of a reply message in response to a request message sent. The entry in the timer table may contain a description of the timer as well as other parameters such as a Timer# and the default timeout value. If, at some time, there are no instances of this timer active (i.e., if there are no outstanding conversations with the controller) then there are no instances of the timer in the Timer_Instance table. Deletion of the Timer table in this situation may result in critical loss of information.

3) Timer_Instance: The Timer_Instance table contains information on current timers being monitored in the system by the Timer module. The parameters of this table are typically the "Start_Time" of the timer and the "Timeout" value. Also, this table would contain the foreign key of Timer#, indicating the type of timer of which this is an instance. This foreign key cannot be null, because it is also part of the key of Timer_Instance, i.e., Timer_Instance is ID dependent on Timer. In addition, since (as with a message) a timeout is related to a single action, the Timer relation also contains the foreign key of Action#, indicating a "one-to-many" relationship between the Action entity (described below) and the Timer entity. Preferably, the foreign key of Action# cannot be null, i.e, every timeout event must correspond to an action (note that the action may be "no action").

4) Action: In servicing a message or timeout event, the Main Program Module first attempts to find a match with an instance of the Message entity. If a match is found, the message or timer database record contains a value for foreign key parameter Action#. This value corresponds to an instance of the Action entity (see FIG. 9).

5.) Invoked_By: The Invoked_By table results from the ternary relationship between Action, Routine and Invocation (see FIG. 4). From this table, the Main program module can determine, for a desired action, the routines to call, the parameters to pass to each routine, and the order in which to call the routines. To accomplish this, the Main Program module queries the database for all entries in the Invoked_By table that contain the desired value for the Action# parameter. These entries are then ordered by the value of the Invocation# parameter. The routines (identified by their Routine#) are then called in order with the parameters indicated by the Parameter_Pointer value.

6) Routine: This table results from the Routine entity and contains information on each of the routine modules in the generic cell controller. Note that this table is not accessed by the main program module in servicing an event, as the necessary information on routines to call (e.g., Routine#, Parameter_Pointer, etc.) can be found in the Invoked_By table. However, the Routine table contains information on routines that may not be presently involved in the Invoked_By relationship. Thus, deletion of this table could result in loss of information.

7) Invocation Num: This table results from the Invocation entity and, may only contain a single parameter used in the Invoked_By table to indicate an ordering of routines associated with an action.

Detailed Description: Internal Timer Module 26

Figures 11, 12A:
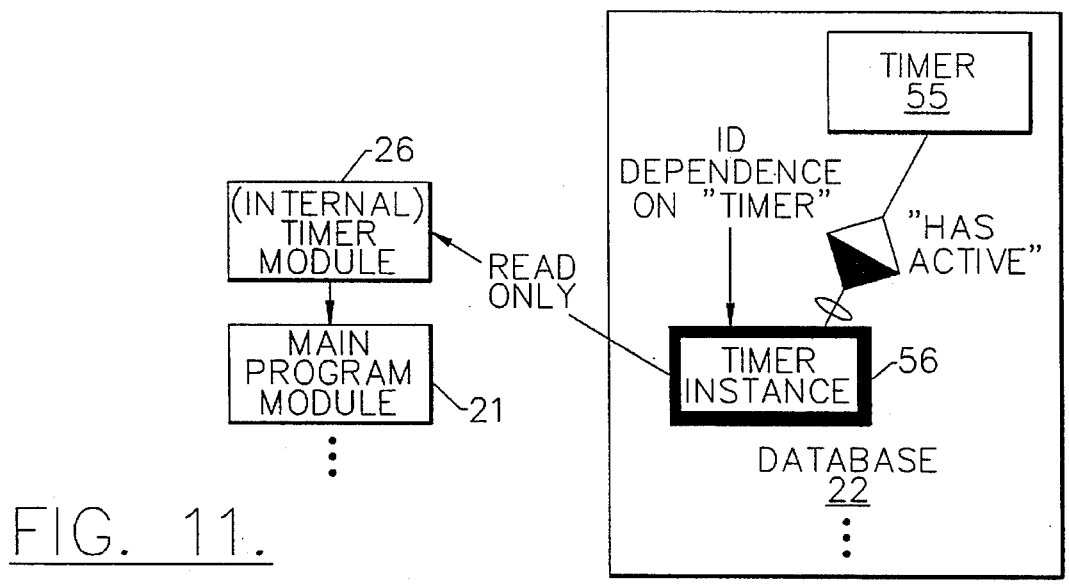

The Internal Timer Module 26 (FIG. 2) manages the internal timers of the generic cell controller. Further, it detects internal timeout events and passes the appropriate information to the Main Program Module 21. The Internal Timer module interacts with a small portion of the database 22, namely the Timer_Instance table, as illustrated in FIG. 11. The Internal Timer module 26 has read only capability with the Timer Instance table 56.

The Internal Timer module functions by continually scanning each entry in the Timer Instance table, comparing the "Start_Time" and "Timeout" values with the "Current_Time". A timeout event occurs if the following condition is satisfied:

Current_Time Start_Time≧Timeout If the above condition holds true for an entry in the Timer Instance table, the Internal Timer module presents the timeout event indication in an appropriate format to the Main Program module. Parameters passed with the indication may detail the type of timeout, and possibly the time that it was detected.

Detailed Description: Routine Modules 23

The Routine Modules 23 (FIG. 2) contain the functionality necessary to implement the details of controller actions. These routines are called by the main program module (see FIG. 3, block 48). Using information stored in the database, the main program module determines which routines to call, the order in which to call the routines, and the parameters to pass to the routines. The execution of a routine may result in any combination of the following three actions.

1) The database is modified. Entries may be added, deleted or modified. It will be understood by those having skill in the art that the modification must be a permitted modification, and data integrity must be maintained. For example, the data parameter of a message may be altered to reflect a recipe change. Alternatively, a timer instance may be created to reflect the fact that a request message has just been received, and no reply yet sent. Routine modules preferably are the only modules that can alter the data in the database because all actions (including database updates) are implemented through calls to routines.

2) A message(s) is sent to a higher or lower level controller(s). The routine may access the database to determine the data to be sent in the message. The routine then passes the information to the Message Parser module where it is formatted into a message conforming to the specified facility-wide format. The routine modules are preferably the only modules that invoke the sending of a message to any source outside the controller.

3) Elements outside the controller are impacted, i.e. the a Routine interacts with elements not defined within the realm of the generic cell controller, as described below.

The Routine Modules implement the details of actions that result from the servicing of an event to the controller. Examples of some of the roles of Routine modules include:

1) Initiating a timer instance. For example, a message has been sent to a child controller and a timely reply is expected. A Routine module would establish a timer for the conversation in the Timer Instance database table, described above. The timer would be monitored by the Internal Timer module described above.

2) Deleting a timer instance. In servicing a timeout event, a Routine module may be called to remove the appropriate timer entry from the Timer Instance database table.

3) Retransmitting a message. If, after a message has been sent to a remote controller, a negative acknowledgement message event or a timeout event is detected, a retransmit Routine module may be called to serve the event. This module would retransmit the initial message.

4) Updating message information in the database. If a message has been received that indicates a change in the state of a machine or process, the information in the database may be modified by a Routine module to reflect the change in the state of the system and the change in expected incoming information.

5) Reading and/or writing from/to an external data structure, i.e., a data structure that is not directly part of the database 22. For example, a Routine module may be directed to update an expert system's knowledge database, or a Routine module might print results to a log file.

6) Serving as an interactive window 46 (FIG. 3) to application modules (such as expert systems, simulation software, etc.) or directly to a user. These modules could be operating concurrently with the generic controller modules. As an example of the use of an interactive application module, a user interface routine may be invoked in a situation where a correctly formatted message received does not have a match in the database. The user interactive routine may be called to determine the course of action from the user and to update portions of the database. Thus the cell controller information can be modified while in operation such that it adapts to new stimuli. The user interactive window interface is used to teach the controller how to react to new stimuli. A more detailed description of such a learning mechanism is provided below.

Interaction of Modules

Having provided a detailed operational description of each component of the embodiment of FIG. 2, each component will now be described in terms of its interaction with other components.

I/O Interpreter 25

This module accepts external incoming data and processes it for use by the Message Parser 24. It also accepts information from the Message Parser and formats it for external transmission. Thus, the I/O Interpreter 25 interacts bidirectionally with both the Message Parser module and external communication drivers. In FIG. 2, it does not interact directly with any other component.

Message Parser 24

The Message Parser module accepts incoming message events from the I/O Interpreter Module 25, and parses these messages for use by the Main Program Module 21. The Message Parser also accepts data from various Routine Modules 23, encodes this information and passes it to I/O Interpreter modules 25 for external transmission. Thus the Message Parser interacts bidirectionally with the I/O Interpreter modules 25, receives information from various Routine modules 23, and sends information to the Main Program Module 21.

Main Program Module 21

The Main Program module directs the servicing of message events parsed by the Message Parser 24, and timeout events parsed by the Internal Timer module 26. To accomplish these tasks, it first queries the database to find a match to the message or timeout event. If a match is found, the Main Program module again queries the database to determine the sequence of Routine(s) 23 that should be called and the parameters that should be passed to these Routines, to service the event. The module then calls the specified Routines 23 in the indicated order with the specified parameters.

A summary of the interaction of the Main Program Module 21 with other modules is as follows:

1) It receives information (reads) from the Message Parser Module 24. It does not send information (write to) the Message Parser Module.

2) It receives information (reads) from the Internal Timer Module 26. It does not send information (write to) the Internal Timer module.

3) It reads (queries) information from the Database 22. It does not write information to the database.

4) It calls specified Routine Modules 23 and passes parameters to these modules.

Database 27

The Database provides for the storage of message and control information for the generic cell controller. The Database reacts to queries and update requests. Unlike the other modules described, it preferably does not serve as a stimulus to any other modules.

The Database preferably serves as the only medium for interaction between the routine modules 23: the modules that ultimately service events. In other words, the routine modules are free of interaction among one another. They are independent of one another.

A summary of the interaction of other modules with the Database module is as follows:

1) The Main Program Module 21 has read only access to the Database 22.
2) Routine Modules 23 have read/write access to the Database 22. They may query for information, delete information, add information, and/or update database information.

Internal Timer Module 26

This module detects timeout events by analyzing the "Timer_Instance" table of the Database 22. Upon detection of a timeout event, it formats the appropriate information and informs the Main Program Module 21 of the event. Thus, the extent of the interaction of the Internal Timer module with the other components is: (1) it has read only access to a portion of the Database 22, and (2) it passes timeout event information to the Main Program Module 21.

Routine Modules 23

As stated earlier, the Routine modules perform the actual functions necessary to service an event including (1), modifying the database, and (2), sending message(s) to external controllers. Preferably Routine Modules are the only modules that can alter the data in the database because all actions (including database updates) are implemented through calls to routines. Moreover, the Routine Modules are preferably the only modules that invoke the sending of a message to any source outside the controller.

The interaction of the Routine Modules 23 with other controller modules is as follows:

1) Routine Modules are preferably called exclusively by the Main Program module 21, and preferably always return control the Main Program module 21 upon completion.
2) Routine Modules can read and/or modify data in the Database. Modifications include adding, deleting or altering information. The Routine Modules are preferably the only modules that can identify data in the database.
3) Routine Modules send information to the Message Parser 24 for transmission to an external controller.

A Learning Mechanism for the Generic Cell Controller

A detailed description of a user window will now be provided. The Generic Cell Controller may use a user window 46 (FIG. 3) to allow the controller to be taught "on the fly", i.e., while in operation. The generic cell controller may he taught on the fly because its control mechanism is incorporated into the database 22, rather than in program code. Dynamic learning is desirable in computer integrated manufacturing systems as these systems are dynamic with respect to product and product flow, and possibly equipment.

As already described, the generic cell controller reacts to a message or timeout stimulus event by trying to find a match between the stimulus and an entry in the database, and then through relations implied by the database, calling Routine(s) in a specified order with specified Parameter(s) to service the event. In many situations however, especially when a system is in its infancy, many unexpected events may occur for which there is no match in the database. The controller may be structured to detect these events and learn from an expert dynamically, i.e., while in operation, how to service these events. This is accomplished with a set of Routines 23 that serve as an interactive window 46 to an expert user. These routines are called as part of an action linked to any message or timeout event that does not have a match in the database.

The routines inform the expert of the anomalous event and query the expert for the action (new or existing) to take to service the event. Assuming the response from the expert is valid (i.e., it satisfies existing system and database integrity rules), the information is entered into the database. The controller has "learned" how to service the event. If the event occurs at a later time, the controller has developed the necessary knowledge to service the event.

It should be noted that the expert (user) described in the previous paragraph need not be a human expert. It may be a knowledge base, artificial intelligence system, or any other qualified decision making body.

An example of a human expert will now be described. The menu screens illustrated in FIGS. 12A–12C illustrate an implementation of a user window 46 for a human user. When an unknown message event is detected, the expert may be presented with a menu shown in FIG. 12A. The expert may bypass the learning process by allowing the controller to return to the idle state without servicing the event. The expert may also bring the system to a halt if the event warrants such extreme action. In the general case however, the expert is expected to teach the controller to service the event on the fly.

If the user chooses to teach the controller on the fly, a screen similar to that of FIG. 12B may appear. This screen allows the expert (through a selection of subscreens) to view the message in detail. The message can be easily inserted into the database 22 as it complies with the facility-wide message format. The expert is also allowed to view the list of currently available actions and the routines, parameters, etc. linked to them. The expert is prompted to enter an Action# to be associated with the message event. The expert may chose an existing Action# to service the event. Assuming the entry passes any system and database integrity checks, the learning process is complete because the existing event is already linked to a set of Routine calls.

Alternatively, if the expert chooses to create a new action to service the event, the controller must learn the Routine calls to be associated with this new action. A screen shown in FIG. 12C may appear. This screen allows the expert to view existing Routines. The expert enters a sequence of Routines to be called and the Parameters to pass to these Routines to implement this new action. After the sequence has been entered, and assuming the entries pass any system and database integrity checks, the database is updated and the learning process is complete. The controller is now equipped to service this and future instances of the event.

The time needed to teach the controller to service an event may vary greatly depending on the type of event, the type of teacher, as well as the teacher-to-controller interface. In some cases, the learning process may be too slow to effectively service the event that initiated the learning sequence. Thus, the learning interface may also contain options to treat the current event instance differently than future occurrences of the event. For example the controller may be instructed to send a "repeat message after n seconds" response to a message event before the learning process commences, so that the controller may be better equipped to handle the anticipated repeat occurrence of the event.

Having provided a complete description of a generic cell controller according to the invention, two Examples will be provided to illustrate generic cell controller operation. In both Examples, the generic cell controller operation is analyzed in a scenario that might occur in a semiconductor manufacturing facility. The facility-wide message format is SECS-II.

Example 1

Etching a Wafer

Figure 13A:
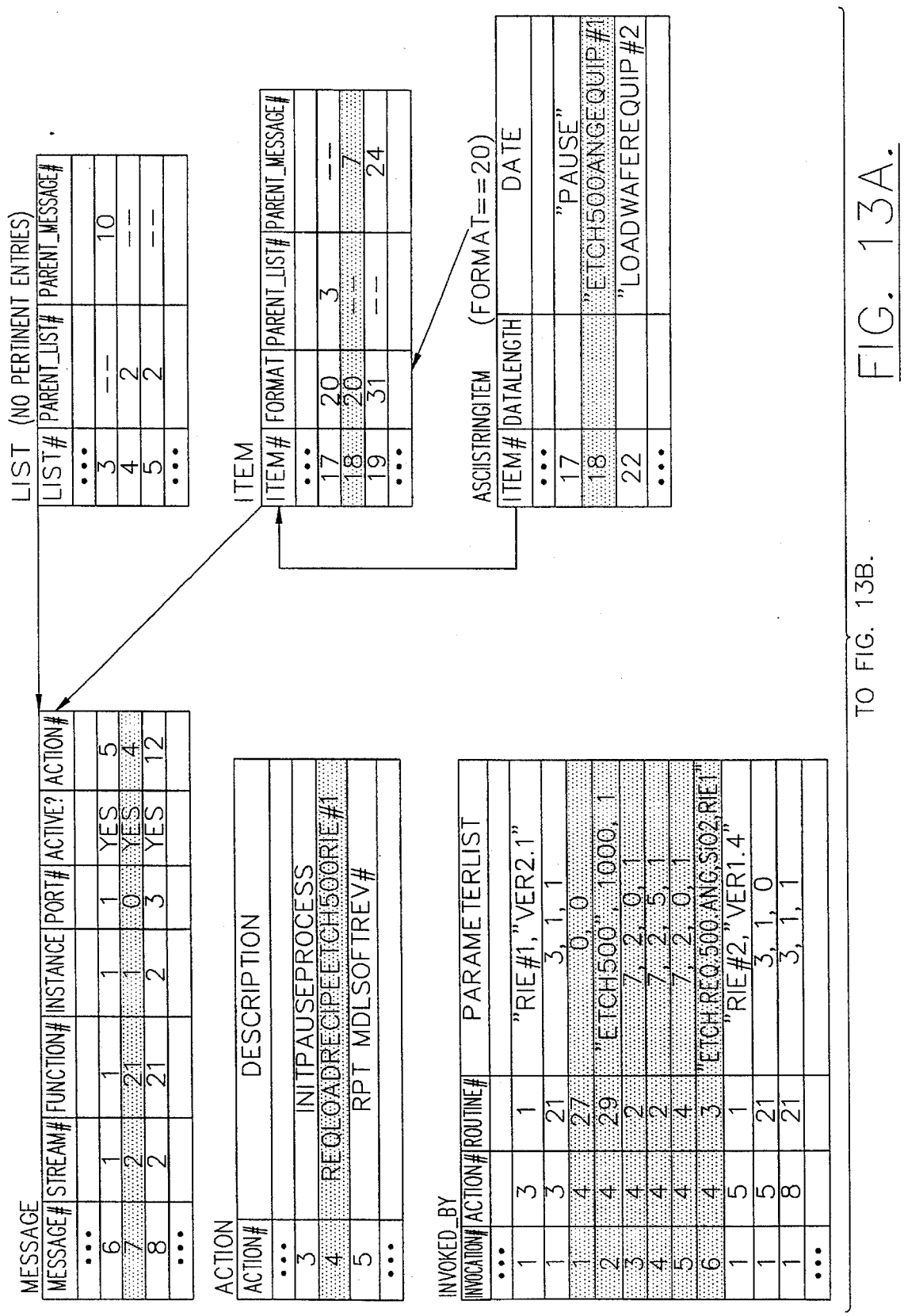

In this Example, a generic cell controller, initially in an idle state 41 (FIG. 3) receives a message from its parent to Etch 500 Angstroms of silicon dioxide ($SiO_2$) on a wafer. The generic cell controller reacts to the message as described above, finding a match to the message in the database and, through relations implied by the database, taking the appropriate action. The portion of this generic cell controller database that pertains to this Example is shown in FIGS. 13A and 13B. Note that some implementation specific parameters have been added to the database tables. Specifically, an "Active?" parameter has been added to the message table. This parameter is used to indicate whether or not a message is expected; for this implementation the generic cell controller should only take the action indicated by the message table entry if that entry is tagged as active.

Figure 14:
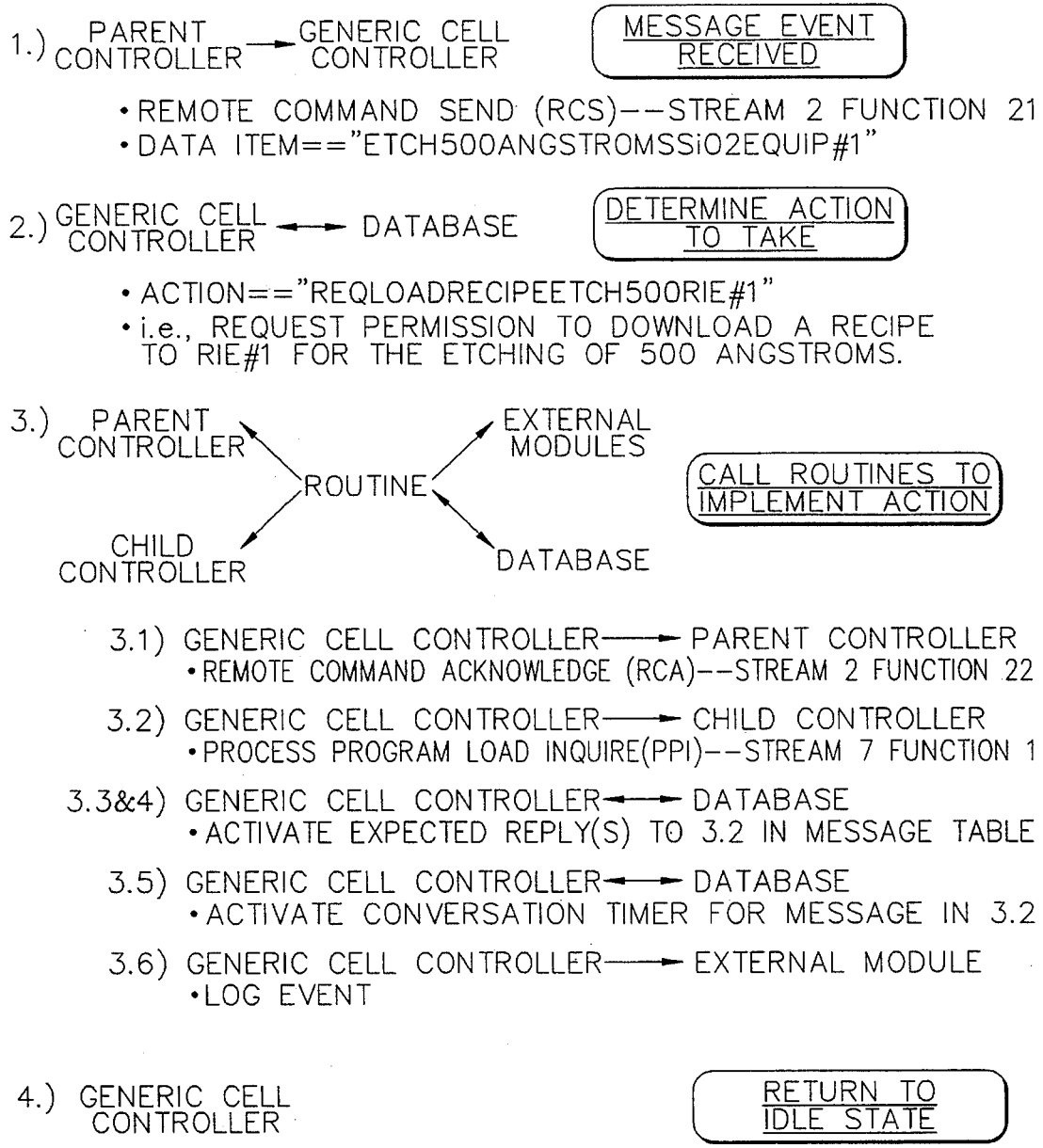
FIG. 14 illustrates operations performed during the example of FIGS. 13A and 13B.

The operational steps that result from generic cell controller action to service the message event is described in FIG. 14. As shown in FIG. 14, a parent controller generates an event to the generic cell controller in the form of a SECS-II message indicating that 500 Angstroms of $SiO_2$ should be etched in a wafer residing in Equipment#1. The command enters the generic cell controller through I/O interpreter module 25a (FIG. 2) where it is stripped of all protocol specific control information. The SECS-II message is then parsed by the Message Parser 24 and presented to the Main Program module 21. The Main Program module services the event by first searching the Message portion of the database 22 (i.e., tables Message, List, and Item—FIGS. 13A and 13B to find a match with the incoming data. As indicated in FIGS. 13A and 13B and 14 a match exists with Message#7. From the Message table, the Main Program module 21 determines that Action#4 should be taken to service the message event. The Action table indicates that Action#4 is "ReqLoadRecipeEtch500RIE#1" i.e., the action will result in a variety of tasks being completed, including the issue of a request to Reactive Ion Etcher#1 to download a recipe to etch 500 Angstroms.

To implement the above action, the Main Program module makes six calls to routines 23 to carry out the tasks, as described in FIG. 14. The Main Program module determines the routines to call, the order in which to call the routines, and the parameters to pass to the routines, from the Invoked_By table shown in FIGS. 13A and 13B. The sequence of routine calls for this action are:

1) RemoteCommandACK(SUCCESS, 0)
2) PPLoadInquire("Etch500", 1000, 1);
3) ActivateDBMessage(7, 2, OK, 1);
4) ActivateDBMessage ( 7, 2, ERROR5, 1);
5) TimerAdd(CONVERS,7, 2, 99, 0, 1);
6) LogEvent("Etch.Request.500.Ang.$SiO_2$.RIE1");

This sequence of routines, when executed, first send an acknowledgement message to the parent controller indicating that the etch job will be initiated. A message is then sent to the appropriate equipment controller requesting that it accept a download of a recipe to perform the etch. An acknowledgement (accept or deny) is expected as a response to this request, thus the appropriate accept and deny messages in the database are tagged ACTIVE to indicate that they are expected. Since the reply is expected in a timely fashion, a conversation timer instance is added to the Timer_Instance table in the database. Finally, the etch request event is logged.

The following is a detailed description of the activities associated with the calling of each of the routines:

1) Routine#27: RemoteCommandACK(SUCCESS, 0): This routine prepares the data to send a Remote Command Acknowledge message (Stream 2 Function 22) to Port#0 (for export to the parent controller). The first routine parameter is the data item to be sent in the message, while the second parameter indicates the port number to which the message is to be sent. For this call to the routine, the data item to be sent with the message is SUCCESS which is defined to be a two byte signed integer with a value of zero. The message and destination information is passed to the Message Parser by this routine which directs the formatting of a Stream 2 Function 23 message. The routine then returns control to the Main Program module. The Message Parser 24 will format the message into the proper SECS-II syntax and forward it to the I/O Interpreter module 24 associated with Port#0 for transmission to the parent controller.

2) Routine#29: PPLoadInquire("Etch500", 1000, 1): This routine prepares the data to send a Process Program Load Inquire message (Stream 7 Function 1) to initiate the download of a recipe to an equipment controller. The first two routine parameters respectively are the Process Program ID and Length data items to be sent in the message, while the third parameter indicates the port number to which the message is to be sent. For this call to the routine, the routine passes the "Etch500" and 1000 data items to the Message Parser and directs the formatting of a Stream 7 Function 1 message. The routine then returns control to the Main Program module. The Message Parser will format the message into the proper SECS-II syntax and forward it to the I/O Interpreter module associated with Port#1 for transmission to the RIE#1 Equipment controller.

Figure 15:
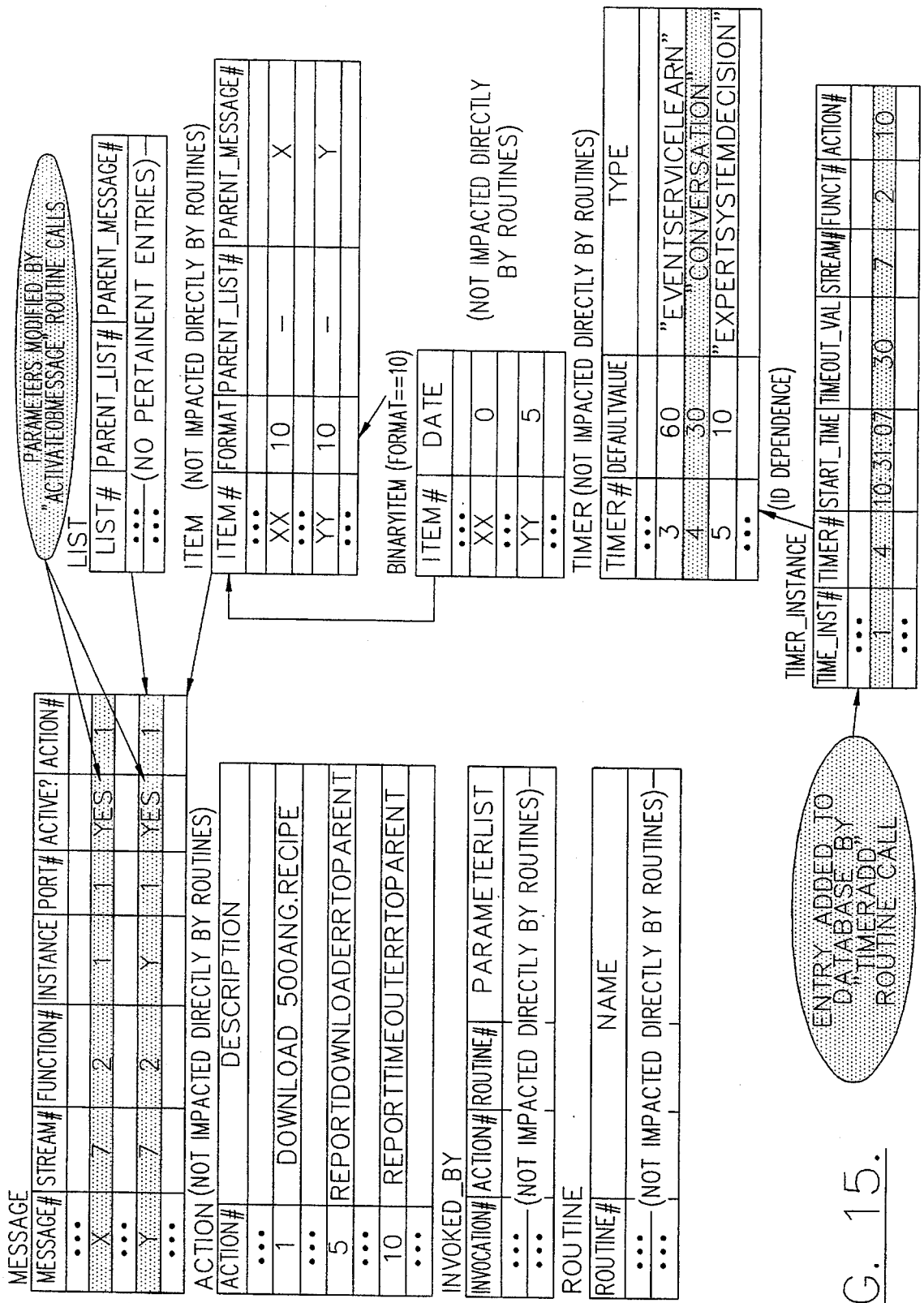
FIG. 15 illustrates further operations performed during the example of FIGS. 13A and 13B.

3) Routine#2: ActivateDBMessage(7, 2, OK, 1): This routine modifies an entry in the Message table, tagging it as active. A tag (described above as the "Active?" parameter) may be used with this implementation to indicate whether a message is expected or not. If a message is expected, it is tagged "YES". If an expected message arrives, the foreign key of Action# indicates the action to take to service the message event. However, if a match is found between an incoming message and a message tagged "NO", the message is unexpected. The generic controller may invoke a user interface routine 46 (FIG. 3) in this instance to "learn" how to deal with the unexpected event. The four routine parameters respectively are the Stream#, Function#, Data, and Port#. In this instance the above PPLoadInquire() routine call has resulted in the scheduling of a Stream 7 Function 1 message to be sent to the RIE#1 Equipment Controller. To be compliant with the SECS protocol, the recipient of the message is expected to respond with a Stream 7 Function 2 message in a timely fashion. The generic cell controller should be made aware that such a response is expected, i.e., the appropriate database message table entry(s) should be tagged as active. This is the function of the ActivateDBMessage routine. For this call to the routine, the message portion of the database would be searched for the Stream 7 Function 2 message with the data "OK", associated with Port#1. The routine assumes that a single match will be found. When a match is found, the routine modifies the database, tagging the entry as "ACTIVE". The routine then returns control the Main Program module. The action of this routine with the database in this instance is illustrated in FIG. 15.

4) Routine#2: ActivateDBMessage(7, 2, ERROR5,1): This routine call is the same as the above call, except that the message entry being altered has a data item of "ERROR5". (See FIG. 15).

5) Routine#4: TimerAdd(CONVERS, 7, 2, 99, 0, 1): This routine adds an entry to the Timer_Instance table. The parameters of the routine call indicate respectively the type of timer, the Stream and Function numbers of the message associated with the timer, the Action# to be associated with the timer, the timeout value (zero indicates use default—the default value may be found in the Timer table), and the port# associated with any message timer. For this particular call, a conversation timer is to be entered where the reply expected is a Stream 7 Function 2 message arriving via port#1. The timeout value will be the default value of 30 seconds. The routine searches the Timer table for the (requested) default value and creates a new entry in the Timer_Instance table with the indicated parameters along with TimeStart (the current time). The routine then returns control to the Main Program Module. The interaction of this routine with the database is illustrated in FIG. 15.

6) Routine#3: LogEvent("Etch.Request.500.Ang.SiO2.RIE1"): For this implementation all events are logged. This routine opens up a file "File.LOG", creates a new line at the end of the file, and enters the text "Etch.Request.500.Ang.SiO2.RIE1" along with the current date and time. The routine then returns control to the Main Program Module. Note that this routine does not impact the generic cell controller database and does not result directly in the sending of any SECS-II formatted messages.

After control returns to the Main Program module from the last routine call, the event is considered serviced and the generic cell controller returns to idle state 41, FIG. 3. Note that although the completion of these tasks (through routine calls) results in the etch request event being serviced, the etch job itself is not complete. The completion of the etch job would require additional stimuli from the equipment (e.g., a Stream 7 Function 2 response to the Process Program Load Inquire message) as part of a sequence of actions, preferably ending with a final job report message sent to the parent controller.

Example 2

Servicing a Timeout

Figure 16:
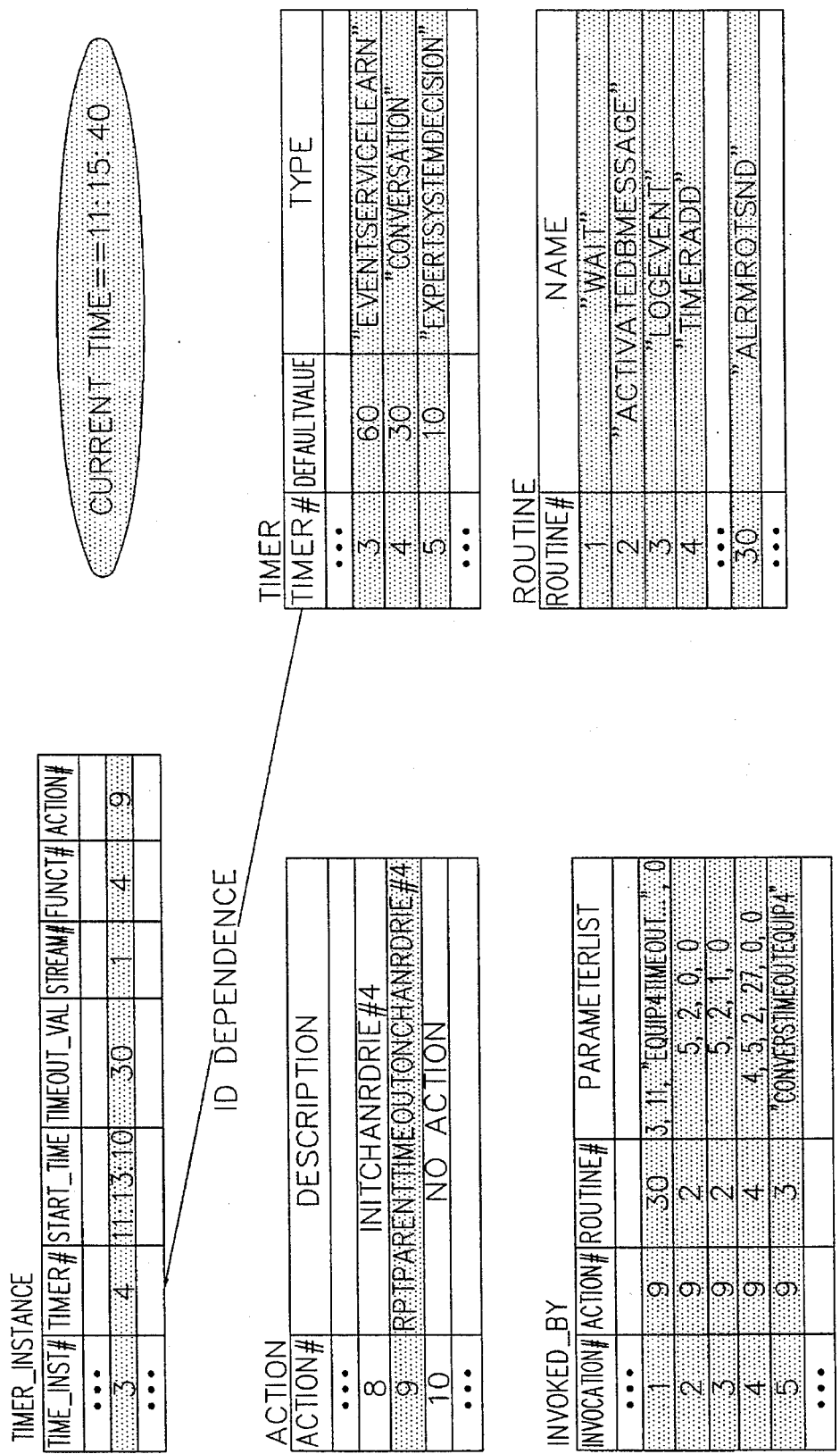
FIG. 16 illustrates a second example of a portion of the database of FIG. 2, during performance of a second operation.

In this Example, a generic cell controller is initially in an idle state 41 (FIG. 3), polling for a message received or a timeout indication (see FIG. 3). A conversation timer instance has been created previously in servicing an earlier event. The Internal Timer Module 26 (FIG. 2), in scanning the Timer_Instance table 56 (FIG. 4), deduces that the conversation timer instance has timed out. The state of the pertinent generic cell controller database tables at the occurrence of the timeout is indicated in FIG. 16. The generic cell controller reacts to the timeout event as described above, finding a match to the timeout indication in the database and, through relations implied by the database, taking the appropriate action.

Figure 17:
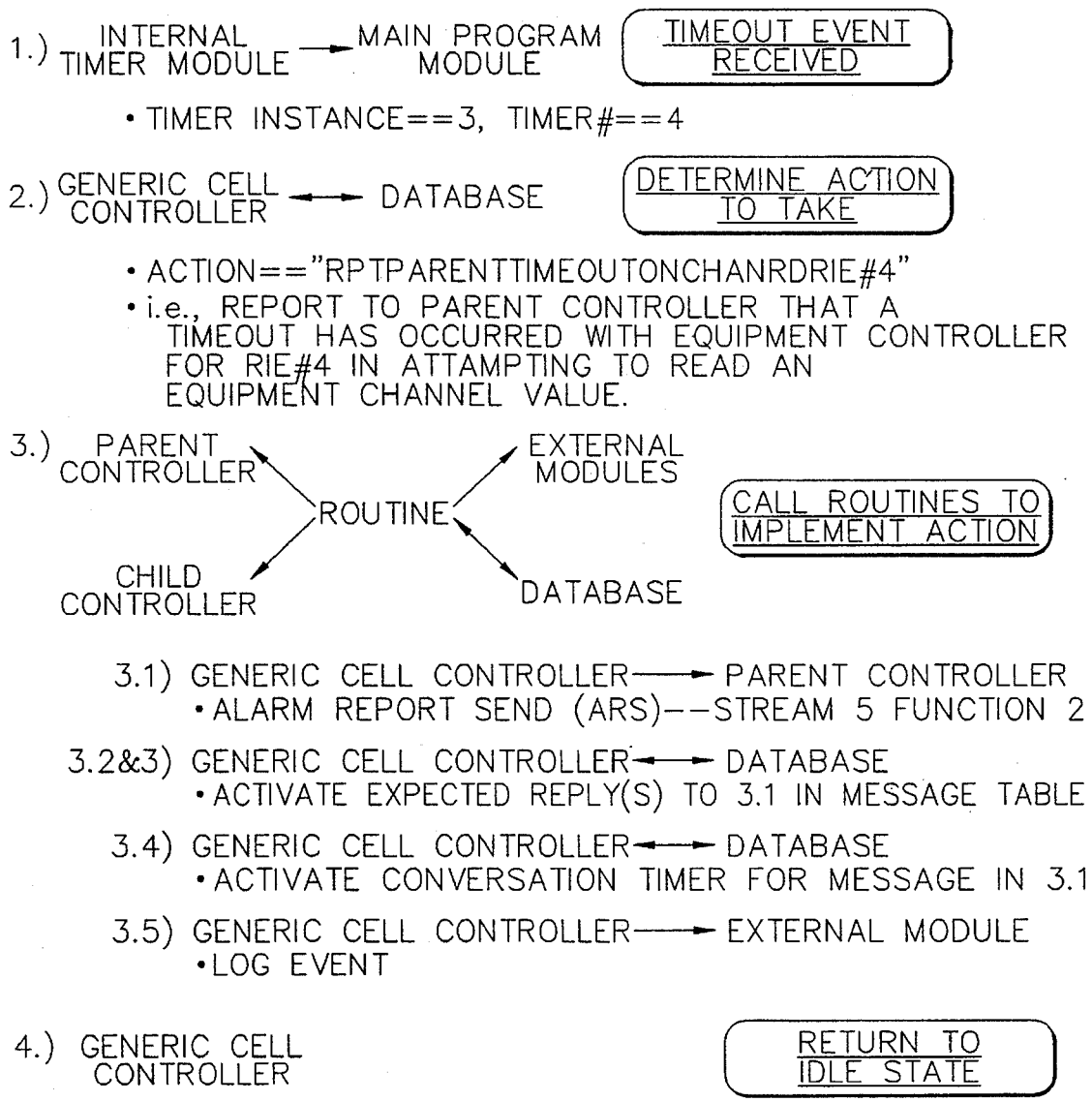
FIG. 17 illustrates operations performed during the example of FIG. 16.

The operational steps that result from generic cell controller action to service the timeout event is described in FIG. 17. As shown in Figure 17, the Internal Timer Module detects that timer instance 3 of type Timer#4 has timed out (as Current_Time Start_Time $\geq$ Timeout_Val) when Current_Time==11:15:40. The Internal Timer Module passes the appropriate information to the Main Program module through a structured variable. The Main Program module services the event by first searching the Timer_Instance table in the database to find a match with the incoming data. As indicated in FIG. 16, a match exists with Timer_Instance#3. From the Timer_Instance table, the Main Program module determines that Action#9 should be taken to service the message event. The Action table indicates that Action#9 is "RptParentTimeoutOnChanRdRIE#4", i.e., the action will result in a variety of tasks being completed including the issue of a report to the parent controller indicating that a timeout has occurred with the equipment controller for Reactive Ion Etcher#4 in attempting to read a channel value.

To implement the above action the Main Program module makes five calls to routines 23 to carry out the tasks as described in FIG. 17. The Main Program module determines the routines to call, the order in which to call the routines, and the parameters to pass to the routines, from the Invoked_By table shown in FIG. 16. The sequence of routine calls for this action are:

1) AlrmRptSnd(EQUIP_STATUS_WARN, 11, "Equip4.TimeOut.Convers.ChanRd", O);

2) ActivateDBMessage(5, 2, OK, 0);

3) ActivateDBMessage(5, 2, ERROR1, 0);

4) TimerAdd(CONVERS, 5, 2, 27, 0, 0)

5) LogEvent("ConversTimeout.Equip4");

This sequence of routines, when executed first sends an Alarm Report message to the parent controller informing the parent controller of the conversation timeout with the (child) equipment controller. An acknowledgement (acknowledge or error) is expected as a response to this report message. Thus, the appropriate acknowledge and error message in the database are tagged ACTIVE to indicate that they are expected. See Example 1 for a description of the use of the "Active?" Message table parameter. Since the reply is expected in a timely fashion, a conversation timer instance is added to the Timer_Instance table in the database. Finally, the timeout event is logged.

The following is a detailed description of the activities associated with the calling of each of the routines. Note that many of the routines are also described in Example 1:

1) Routine#30: AlrmRptSnd(EQUIP_STATUS_WARN, 11, "Equip4.TimeOut.Convers.ChanRd"O); This routine prepares the data to send an Alarm Report Send message (Stream 5 Function 1) to inform the parent controller of the timeout. The first three routine parameters respectively are the Alarm Code (EQUIP_STATUS_WARN==3), the Alarm ID, and the Alarm Text. The fourth parameter indicates the port number to which the message is to be sent. The routine passes the four data items to the Message Parser and directs the formatting of a Stream 5 Function 1 message. The routine then returns control the Main Program module. The Message Parser will format the message into the proper SECS-II syntax and forward it to the I/O Interpreter module associated with Port#0 for transmission to the parent controller.

3) Routine#2: ActivateDBMessage(5, 2, OK, 0): This routine modifies an entry in the Message table, tagging it as active, see Example 1. In this instance, the above AlrmRptSnd() routine call has resulted in the scheduling of a Stream 5 Function 1 message to be sent to the parent controller. To be compliant with the SECS protocol, the recipient of the message is expected to respond with a Stream 5 Function 2 message in a timely fashion. The generic cell controller should be made aware that such a response is expected, i.e., the appropriate database message table entry(s) should be tagged as active. For this call to the routine, the message portion of the database would be searched for the Stream 5 Function 2 message, with the data "OK", associated with Port#0. The routine assumes that a single match will be found. When a match is found, the routine modifies the database, tagging the entry as "ACTIVE". The routine then returns control the Main Program module.

4) Routine#2: ActivateDBMessage(5, 2, ERROR1, 1): This routine call is the same as the above call, except that the message entry being altered has a data item of "ERROR1".

5) Routine#4: TimerAdd(CONVERS, 5, 2, 27, 0, 0): This routine adds an entry to the Timer_Instance table. The parameters of the routine call indicate respectively the type of timer, the Stream and Function numbers of the message associated with the timer, the Action# to be associated with the timer, the timeout value (zero indicates use default—the default value may be found in the Timer table), and the Port# associated with any message timer. For this particular call, a conversation timer is to be entered where the reply expected is a Stream 5 Function 2 message arriving via Port#0. The timeout value will be the default value of 30 seconds. The routine searches the Timer table for the (requested) default value and creates a new entry in the Timer-Instance table with the indicated parameters along with TimeStart (the current time). The routine then returns control to the Main Program Module.

6) Routine#3: LogEvent("ConversTimeout.Equip4"): For this implementation all events are logged. This routine opens up a file "File LOG", creates a new line at the end of the file, and enters the text "ConversTimeout.Equip4" along the current date and time. The routine then returns control to the Main Program Module. Note that this routine does not impact the generic cell controller database and does not result directly in the sending of any SECS-II formatted messages.

After control returns to the Main Program module from the last routine call, the event is considered serviced and the generic cell controller returns to an idle state.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. Apparatus for controlling manufacturing operations by a plurality of manufacturing tools, each of said manufacturing tools having a tool controller associated therewith, said apparatus comprising:

manufacturing operation command accepting means, for accepting a command to perform a manufacturing operation on one of said manufacturing tools;

sequential step determining means, responsive to an accepted command, for determining a sequence of steps to implement the manufacturing operation;

a plurality of operational instruction generating means, a respective one of which is responsive to a respective step in the sequence of steps, for generating operational instructions for the tool controller associated with the one manufacturing tool, to implement the respective step; and means for providing the operational instructions, generated by the plurality of generating means, to the tool controller of the one manufacturing tool, such that the tool controller controls the one manufacturing tool to perform the manufacturing operation;

wherein said sequential step determining means comprises:

a database, having a plurality of entries for each of a corresponding plurality of manufacturing operations, each entry including parameters for the associated manufacturing operation and an indication of a sequence of steps for the associated manufacturing operation;

means for matching an accepted command to a corresponding database entry and for providing an indication that an accepted command does not match any entry in said database;

means for sequentially activating predetermined ones of said operational instruction generating means, in a sequence determined by the corresponding database entry, and for providing the associated parameters from the corresponding database entry to the activated operational instruction generating means; and means, responsive to said indication that an accepted command does not match any entry in said database, for effecting creation of a new database entry for the accepted command which does not match any entry in said database, said effecting means comprising:

means for receiving plurality of instructions corresponding to a plurality of manufacturing operations, each instruction including parameters for the associated manufacturing operation and an indication of a sequence of steps for the associated manufacturing operation; and means responsive to receipt of said plurality of instructions corresponding to a plurality of manufacturing operations, for storing the received instructions as entries in said database.

2. The apparatus of claim 1 wherein said command accepting means comprises means for accepting manufacturing operation commands in a predetermined communication protocol, and for stripping the predetermined communication protocol from said commands.

3. The apparatus of claim 2 wherein said command accepting means further comprises means for extracting data from the commands which are stripped of said predetermined communication protocol.

4. The apparatus of claim 1 wherein said database comprises a relational database, having entity relationship models for associating parameters and sequences of steps with each manufacturing operation.

5. The apparatus of claim 1 wherein said plurality of operational instruction generating means operate independent of one another.

6. The apparatus of claim 1 wherein said sequential step determining means is further responsive to expiration of a preset time period, for determining the sequence of steps.

7. Apparatus for controlling manufacturing operations by a plurality of manufacturing tools, each of said manufacturing tools having a tool controller associated therewith, said apparatus comprising:

means for accepting tool independent coordinating instructions for controlling manufacturing operations;

generic controlling means, responsive to said tool independent coordinating instructions, for generating tool independent operational instructions for controlling at least one of said manufacturing tools; and at least one generic-to-tool translator associated with a respective at least one of said manufacturing tools, and responsive to said tool independent operational instructions, for generating tool dependent operational instructions and for providing said tool dependent operational instructions to the tool controller associated with the at least one manufacturing tool, to thereby cause said tool controller to control said tool and perform manufacturing operations;

wherein said generic controlling means comprises:
a database, having a plurality of entries for each of a corresponding plurality of tool independent coordinating instructions, each entry including parameters for the associated operational instruction and an indication of a sequence of steps for the associated operational instruction;
a plurality of timers, each of which corresponds to one of said plurality of entries for each of a corresponding plurality of tool independent coordinating instructions;
means for matching an accepted instruction to a corresponding database entry;
means for detecting expiration of one of said plurality of timers; and
means, responsive to said detecting means, for matching an expired one of said plurality of timers to a corresponding database entry, such that said generic controlling means generates tool independent operational instructions upon receipt of a tool independent coordinating instruction and upon expiration of a timer.

8. The apparatus of claim 7 wherein said instruction accepting means comprises means for accepting tool independent coordinating instructions in a predetermined communication protocol and for stripping the predetermined communication protocol from said instructions.

9. The apparatus of claim 8 wherein said instruction accepting means further comprises means for extracting data from the instructions which are stripped of said predetermined communication protocol.

10. The apparatus of claim 7 wherein said at least one generic-to-tool translator comprises a corresponding at least one tool dependent operation instruction generating means, for generating tool dependent operational instructions;

said generic controlling means further comprising means for sequentially activating predetermined ones of said tool dependent operational instruction generating means, in a sequence determined by the corresponding database entry, and for providing the associated parameters from the corresponding database entry to the activated tool dependent operational instruction generating means.

11. The apparatus of claim 7 wherein said database comprises a relational database, having entity relationship models for associating parameters and sequences of steps with tool independent coordinating instruction.

12. The apparatus of claim 7 wherein said generic-to-tool translators operate independent of one another.

13. The apparatus of claim 7 wherein said matching means further comprises means for providing an indication that an accepted instruction does not match any entry in said database.

14. The apparatus of claim 13 further comprising means, responsive to said indication, for effecting creation of a new database entry for the accepted instruction which does not match any entry in said database.

15. A computer integrated manufacturing system comprising:

a factory controller;

a plurality of manufacturing tool controllers;

a like plurality of manufacturing tools, a respective one of which is responsive to a respective one of said manufacturing tool controllers, for performing manufacturing operations; and a plurality of generic cell controllers, hierarchically connected between said factory controller and said plurality of manufacturing tool controllers, each of said generic cell controllers comprising:
means for accepting manufacturing commands;
means, responsive to an accepted manufacturing command, for determining a sequence of steps to implement an accepted manufacturing command;
a plurality of manufacturing instruction generating means, a respective one of which is responsive to a respective step in the sequence of steps, for generating manufacturing instructions for implementing the respective step; and
means for accepting the manufacturing instructions generated by the plurality of manufacturing instruction generating means;
wherein said sequential step determining means comprises:
a database, having a plurality of entries for each of a corresponding plurality of manufacturing command, each entry including parameters for the associated manufacturing command and an indication of a sequence of steps for the associated manufacturing command;
means for matching an accepted command to a corresponding database entry; and
means for sequentially activating predetermined ones of said manufacturing instruction generating means, in a sequence determined by the corresponding database entry, and for providing the associated parameters from the corresponding database entry to the activated manufacturing instruction generating means;

at least one of said manufacturing instruction generating means including means for modifying at least one of said plurality of entries in said database, such that modified manufacturing instructions, having at least one of a modified sequence and modified parameters from that which was originally stored in said database, are generated by said plurality of generic cell controllers in response to an accepted manufacturing command.

16. The system of claim 15 wherein said command accepting means comprises means for accepting manufacturing operation commands in a predetermined communication protocol, and for stripping the predetermined communication protocol from said commands.

17. The system of claim 16 wherein said command accepting means further comprises means for extracting data from the commands which are stripped of said predetermined communication protocol.

18. The system of claim 15 wherein said database comprises a relational database, having entity relationship models for associating parameters and sequences of steps with each manufacturing command.

19. The system of claim 15 wherein said manufacturing instruction generating means operate independent of one another.

20. The system of claim 15 wherein said matching means further comprises means for providing an indication that an accepted command does not match any entry in said database.

21. The system of claim 20 further comprising means, responsive to said indication, for effecting creation of a new database entry for the accepted command which does not match any entry in said database.

22. The system of claim 15 wherein said sequential step determining means is also responsive to expiration of a preset time period, for determining the sequence of steps.

23. A method for controlling manufacturing operations by a plurality of manufacturing tools, each of said manufacturing tools having a tool controller associated therewith, said method comprising the steps of:

accepting a command to perform a manufacturing operation on one of said manufacturing tools;

determining a sequence of steps to implement the manufacturing operation;

generating operational instructions for the tool controller associated with the one manufacturing tool, for each respective step in the sequence; and providing the generated operational instructions to the tool controller of the one manufacturing tool, such that the tool controller controls the one manufacturing tool to perform the manufacturing operation;

wherein said determining step comprises the step of:
matching an accepted command to an entry in a database, having a plurality of entries for each of a corresponding plurality of manufacturing operations, each entry including parameters for the associated manufacturing operation and an indication of a sequence of steps for the associated manufacturing operation;

wherein said generating step comprises the step of generating the operational instructions, in a sequence determined by the corresponding database entry, using the associated parameters from the corresponding database entry; and wherein said matching step further comprises the step of providing an indication that an accepted command does not match any entry in said database;

said method further comprising the step of effecting creation of a new database entry for the accepted command which does not match any entry in said database in response to an indication that an accepted command does not match any entry in said database, wherein said effecting step comprises the steps of:
receiving a plurality of instructions corresponding to a plurality of manufacturing operations, each instruction including parameters for the associated manufacturing operation and an indication of a sequence of steps for the associated manufacturing operation; and storing the received instructions corresponding to a plurality of manufacturing operations as entries in said database.

24. The method of claim 23 wherein said command accepting step comprises the step of accepting manufacturing operation commands in a predetermined communication protocol, and stripping the predetermined communication protocol from said commands.

25. The method of claim 24 wherein said command accepting step further comprises the step of extracting data from the commands which are stripped of said predetermined communication protocol.

26. A method for controlling manufacturing operations by a plurality of manufacturing tools, each of said manufacturing tools having a tool controller associated therewith, said method comprising the steps of:

accepting tool independent coordinating instructions for controlling manufacturing operations;

generating tool independent operational instructions for controlling at least one of said manufacturing tools, in response to said tool independent coordinating instructions;

translating the tool independent operational instructions into tool dependent operational instructions; and providing the tool dependent operational instructions to the tool controller associated with the at least one manufacturing tool, to thereby cause said tool controller to control said tool and perform manufacturing operations;

wherein said generating step comprises the step of:
matching an accepted coordinating instruction to an entry in a database, having a plurality of entries for each of a corresponding plurality of tool independent coordinating instructions, each entry including parameters for the associated operational instruction and an indication of a sequence of steps for the associated operational instruction;

providing a plurality of timers, each of which corresponds to one of said plurality of entries for each of a corresponding plurality of tool independent coordinating instructions;

detecting expiration of one of said plurality of timers; and matching an expired one of said plurality of timers to a corresponding database entry, such that tool independent operational instructions are generated upon receipt of a coordinating instruction and expiration of a timer.

27. The method of claim 26 wherein said instruction accepting step comprises the step of accepting tool independent coordinating instructions in a predetermined communication protocol and stripping the predetermined communication protocol from said instructions.

28. The method of claim 27 wherein said instruction accepting step further comprises the step of extracting data from the instructions which are stripped of said predetermined communication protocol.

29. The method of claim 26 wherein said translating step comprises the step of:

sequentially generating said tool dependent operational instructions, in a sequence determined by the corresponding database entry, using the associated parameters from the corresponding database entry.

30. The method of claim 26 wherein said matching step further comprises the step of providing an indication that an accepted instruction does not match any entry in said database.

31. The method of claim 30 further comprising the step of effecting creation of a new database entry for the accepted instruction which does not match any entry in said database.

* * * * *